United States Patent [19]
Marcuse et al.

[11] Patent Number: 5,608,561
[45] Date of Patent: Mar. 4, 1997

[54] METHOD AND SYSTEM FOR REDUCING CHIRP IN AN OPTICAL CUMMUNICATION SYSTEM

[75] Inventors: Dietrich Marcuse, Lincroft; Thomas H. Wood, Holmdel, both of N.J.

[73] Assignee: Lucent Technologies Inc., Murray Hill, N.J.

[21] Appl. No.: 479,036

[22] Filed: Jun. 7, 1995

[51] Int. Cl.$^6$ ........................................ H04B 10/00
[52] U.S. Cl. .................... 359/161; 359/173; 359/181; 359/188
[58] Field of Search ................... 359/161, 173, 359/181–186, 188, 245; 385/2, 8, 14

[56] References Cited

U.S. PATENT DOCUMENTS

| | | | |
|---|---|---|---|
| 5,303,079 | 4/1994 | Gnauck et al. | 359/188 |
| 5,311,351 | 5/1994 | Chesnoy | 359/184 |
| 5,420,868 | 5/1995 | Chraplyvy et al. | 359/173 |

OTHER PUBLICATIONS

L. Bickers et al., "Reduction of Laser Chirp in 1.5 μm DFB Lasers By Modulation Pulse Shaping", *Electron. Letts.*, vol. 21, No. 3, Jan. 1985, pp. 103–104.

R. Olshansky et al., "Reduction of Dynamic Linewidth in Single–Frequency Semiconductor Lasers", *Electron. Letts.*, vol. 20, No. 22, Oct. 1984, pp. 928–929.

M. Suzuki et al., "2.4 Gbits/s 100km Penalty–Free Conventional Fibre Transmission Experiments Using GaInAsP Electroabsorption Modulator", *Electron. Letts.*, vol. 25, No. 3, Feb. 1989, pp. 192–193.

M. Nazarathy et al., "Progress in Externally Modulated AM CATV Transmission Systems", *J. Lightwave Techno.*, vol. 11, No. 1, Jan. 1993, pp. 82–86.

D. Marcuse et al., "Time–Dependent Simulation of Laster–Modulator Combination", *IEEE J. of Quantum Electron.* vol. 30, No. 12, Dec. 1994, pp. 2743–2755.

M. Suzuki et al., "Electrical and Optical Interactions Between Integrated InGaAsP/InP DFB Lasers and Electroabsorption Modulators", *J. Lightwave Techno.*, vol. 6, No. 6, Jun. 1988, pp. 779–784.

T. H. Wood, "Multiple Quantum Well, (MQW) Waveguide Modulators", *J. Lightwave Technol.*, vol. 6, No. 6, Jun. 1988, pp. 743–757.

*Primary Examiner*—Wellington Chin
*Assistant Examiner*—Kinfe-Michael Negash

[57] ABSTRACT

In external modulation, a modulated light signal is shaped to decrease pulse transition times resulting in less chirp. Accordingly, the modulated signal travels greater distances with less pulse distortion over an optical medium. For an integrated-type of external modulator, chirp is reduced further by using a laser modulator coupled to multiple complementary output ports.

20 Claims, 22 Drawing Sheets

B=1.75 GHz

B=1.75 GHz

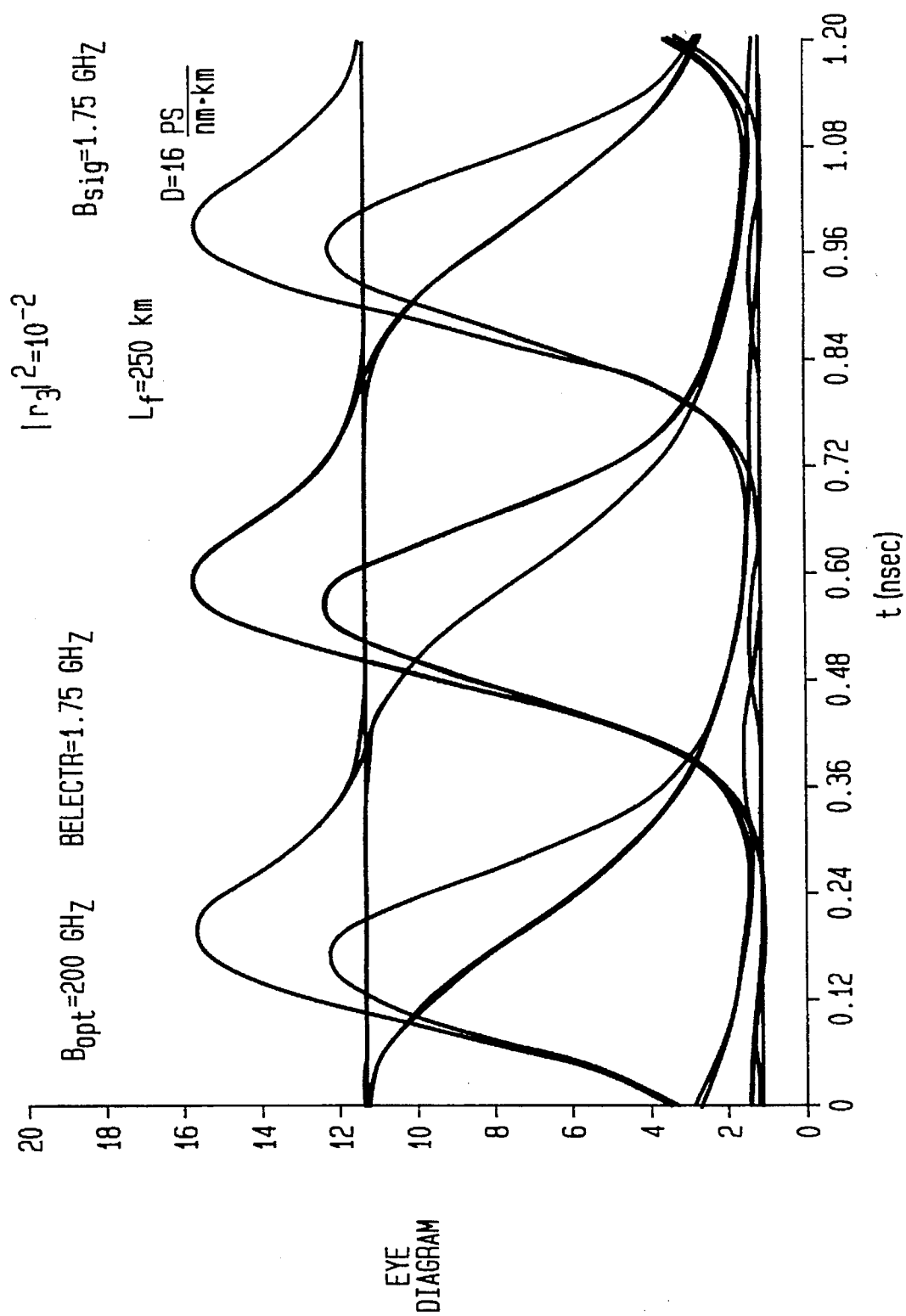

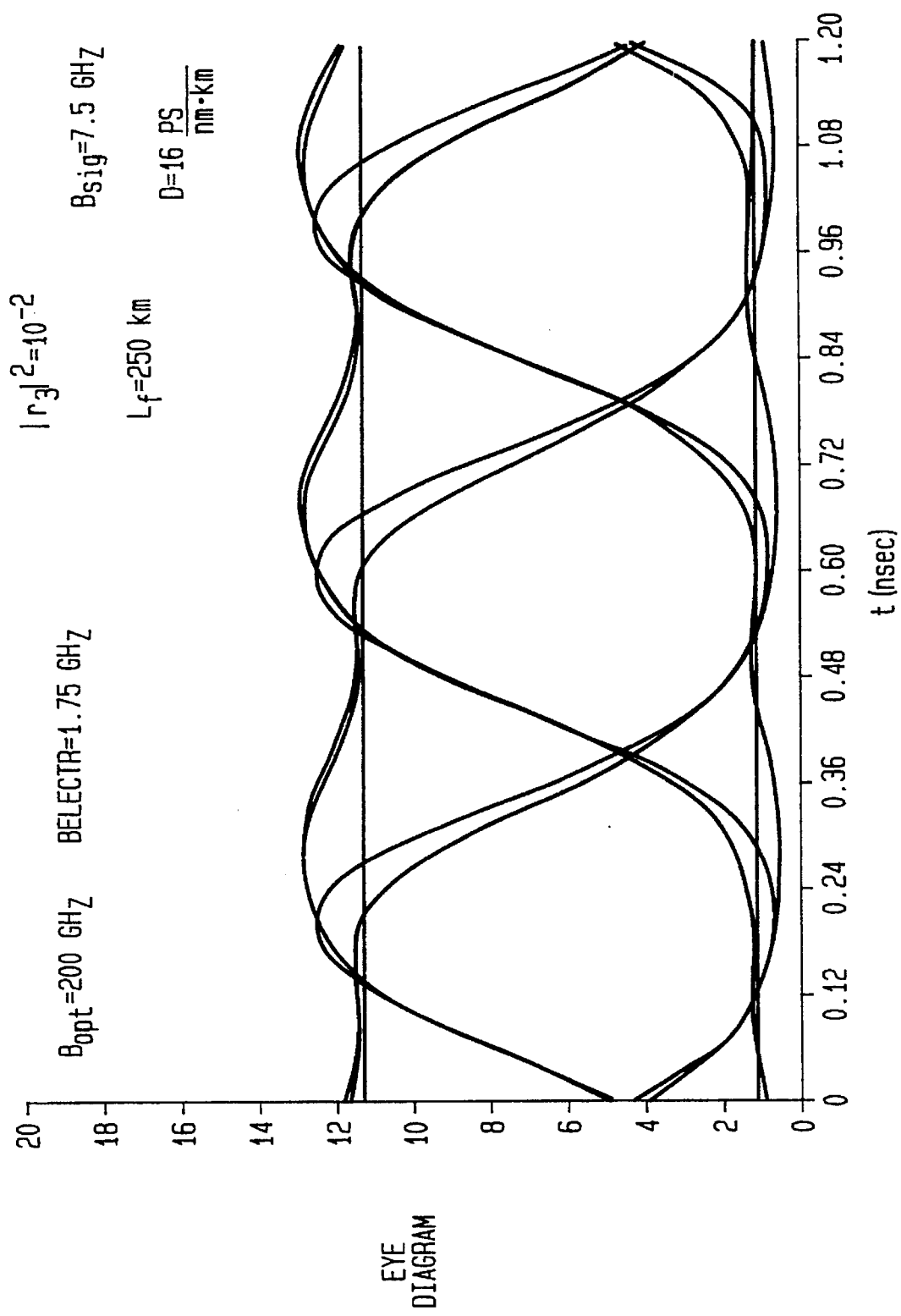

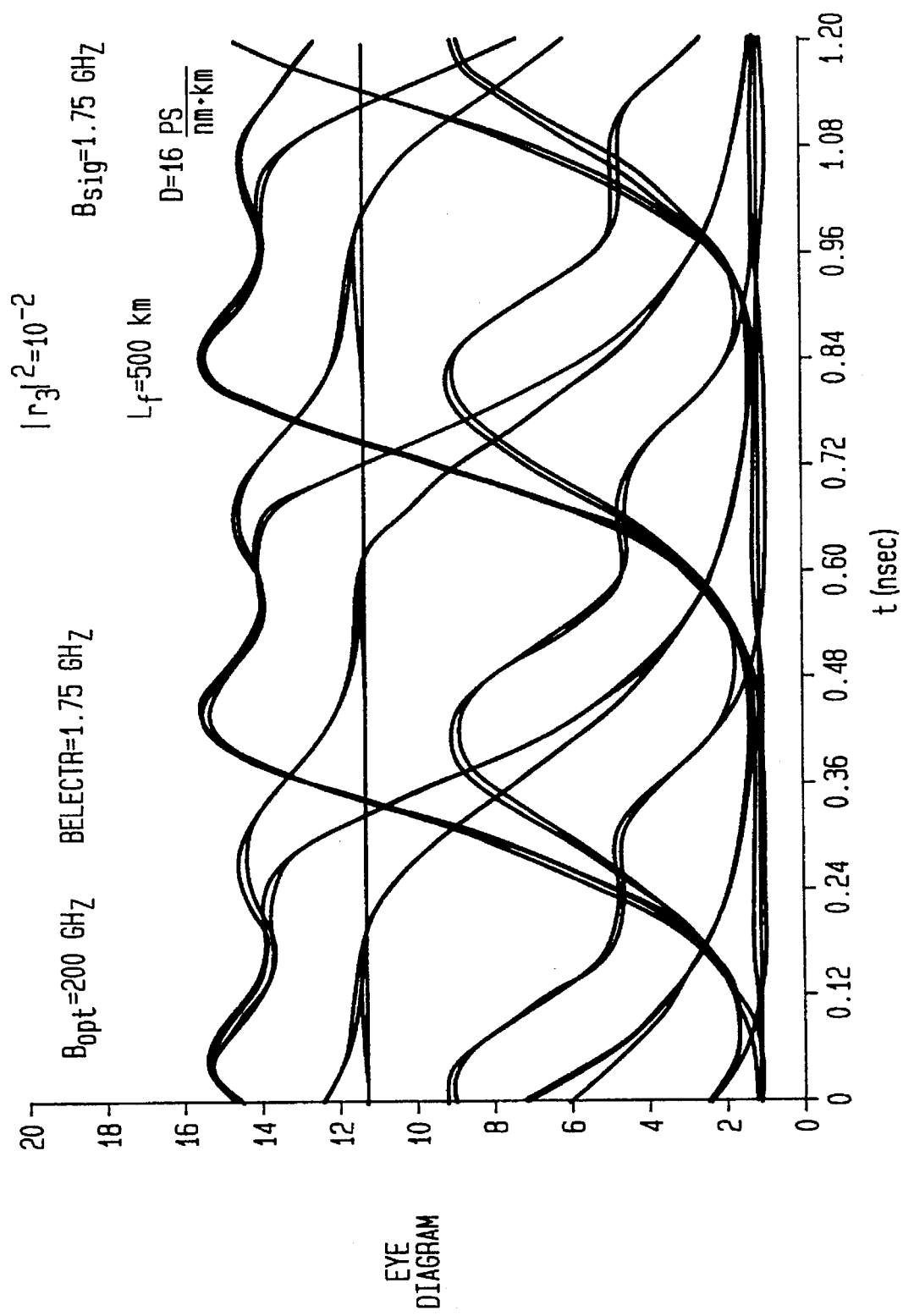

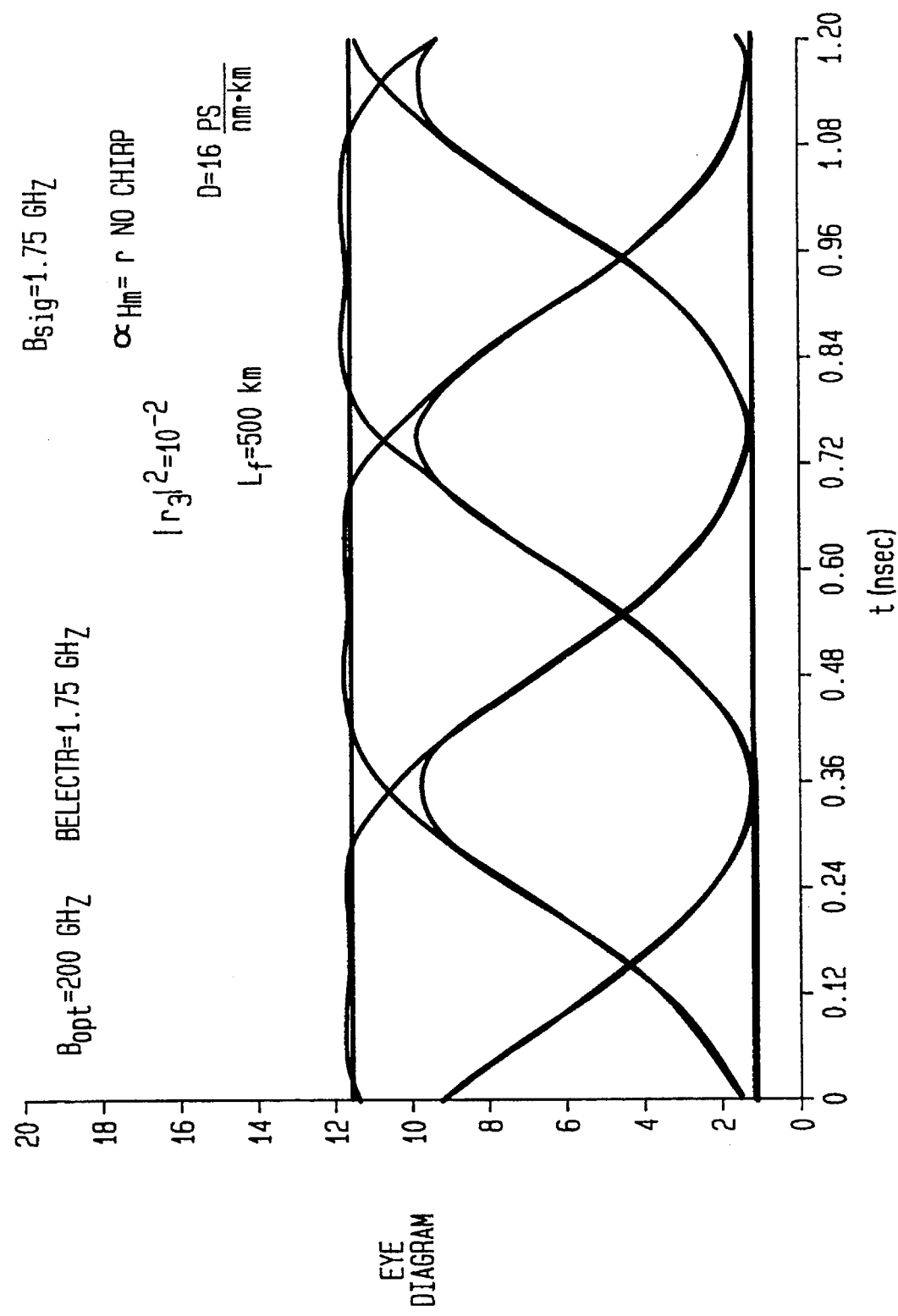

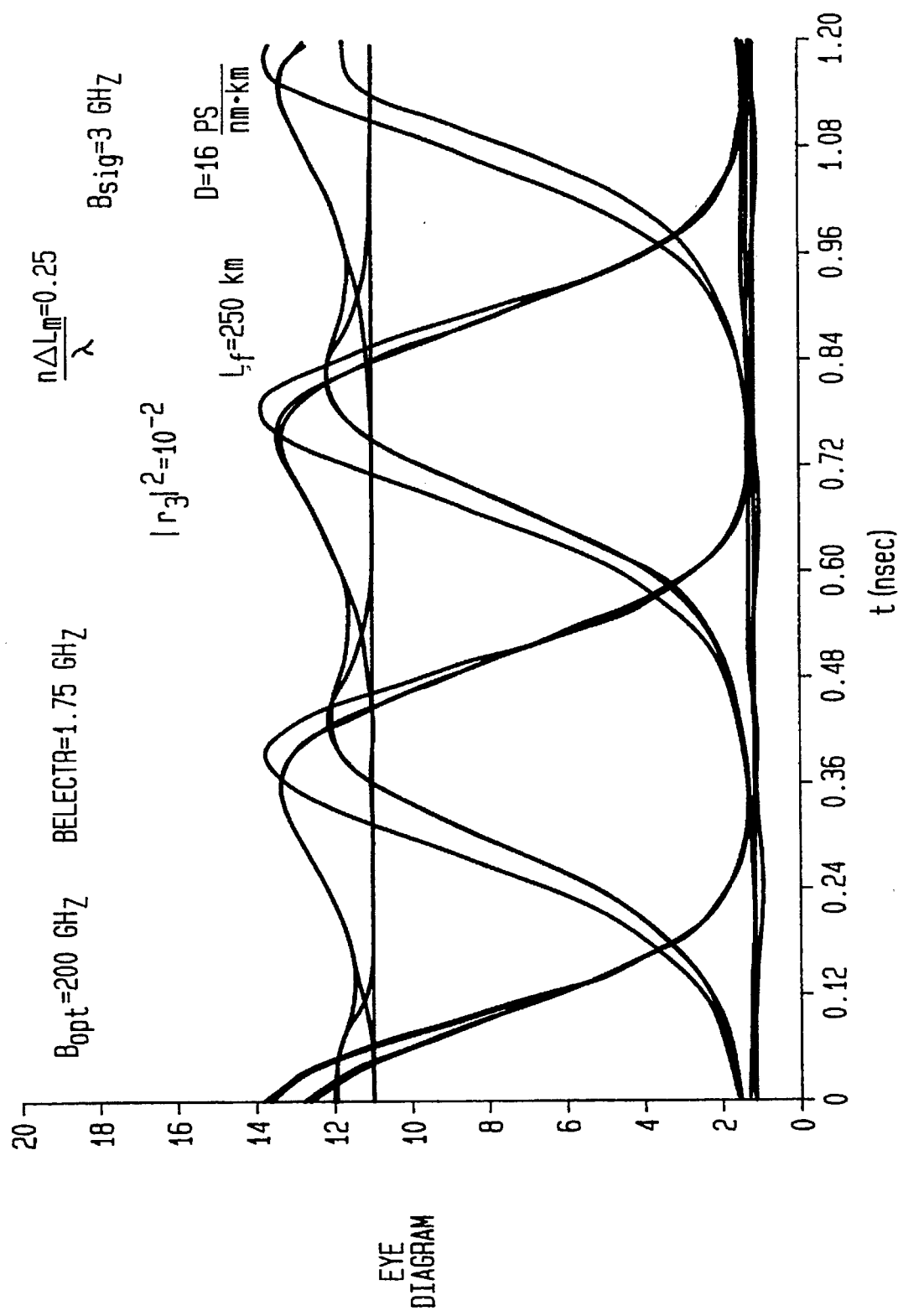

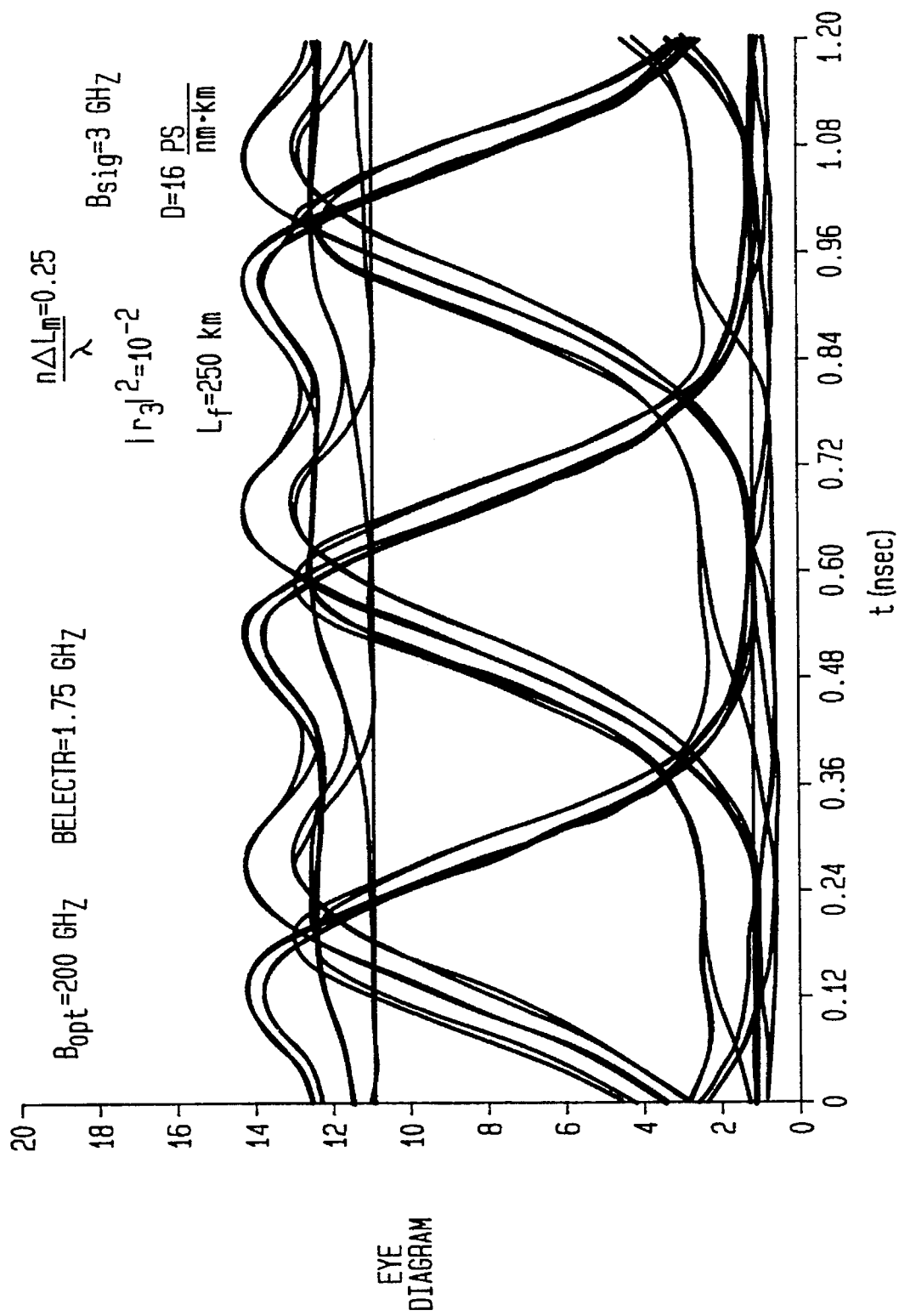

METHOD AND SYSTEM FOR REDUCING CHIRP IN AN OPTICAL CUMMUNICATION SYSTEM

CROSS REFERENCE TO RELATED APPLICATIONS

This patent application is related to commonly owned, copending application Ser. No. (08/479,037), Attorney Docket No. JAO 37041, entitled A Method and System for Reducing Chirp in an External Modulator, by Thomas H. Wood, filed concurrently herewith, and incorporated herein by reference.

BACKGROUND OF THE INVENTION

1. Field of the Invention

The present invention relates generally to a method and system for reducing chirp in optical communication and for providing a low-chirp externally-modulated laser.

2. Related Art

During laser modulation, a minimum level of spectral broadening necessarily occurs. Chirp, however, is an excess of spectral broadening beyond the spectral width required for modulation. Because different wavelengths propagate at different speeds in a dispersive medium, such as an optical fiber, the presence of significant chirp causes greater pulse spreading for a modulated optical signal transmitted across a fiber optic network.

Thus, reducing chirp has long been desired in optical communication. Low-chirp modulated laser sources are especially necessary in long-haul, high bit rate optical fiber transmission systems where chirp-induced pulse distortion reduces performance and range.

Two general approaches are typically used to modulate laser light: direct modulation and external modulation. In direct modulation, a laser such as a laser diode, is directly modulated by an information signal to generate a modulated laser output. In external modulation, a modulator is used to modulate light from a laser source such as a laser diode. An information signal is then applied to the modulator rather than to the laser as in direct modulation.

Moreover, in external modulation, two different arrangements are used for packaging the external modulator with respect to the laser source. The arrangement chosen also affects the amount of chirp. In the first arrangement, the modulator and laser are disposed on separate, discrete substrates. In the second arrangement, the modulator and laser are fabricated as an integrated modulator substrate on a common chip.

Each of these laser modulation approaches involve chirp. Under a direct modulation approach, the amount of chirp can be proportional to changes in the log of the laser output power over time. Thus, high-speed direct modulation of a laser output can produce substantial chirp, especially when the laser is driven to create sharp laser pulses with abrupt rising and falling edges. See, for instance, the Bickers and Westbrook article which describes reducing laser chirp in direct modulation by smoothing modulation pulse transitions ("Reduction of Laser Chirp in 1.5 µm DFB Lasers By Modulation Pulse Shaping," *Electron. Letts.* 21 (3):103–104 (31st Jan. 1985)) and the Olshansky and Fye article which describes reducing chirp in direct modulation by using a small current step in the leading edge of the drive pulse (Olshansky, R. et al., "Reduction of Dynamic Linewidth in Single-Frequency Semiconductor Lasers," *Electron. Letts.* 20 (22):928–929 (25th Oct. 1984)), both of which are incorporated herein by reference.

External modulation is favored in applications sensitive to chirp, such as long-distance optical communications, where the excessive spectral broadening in the emitted modulated light due to chirp leads to a greater pulse distortion during propagation and a reduction in overall performance. In external modulation, however, chirp can further arise from electrical and optical interactions between the laser and the modulator. Thus, in the first external modulation arrangement discussed above, chirp can be reduced by isolating the discrete modulator and laser, electrically and optically, from each other. For instance, decoupling capacitors can be used to block stray DC current between the laser and modulator. An optical isolator which only allows light to travel in one direction can be inserted in a fiber or space between the laser and modulator to prevent reflections of light back from the modulator to the laser. See, for example, Suzuki, M. et at., "2.4 Gbit/s 100 km Penalty-Free Conventional Fibre Transmission Experiments Using GainAsP Electroabsorption Modulator," *Electron. Letts.* 25(3): 192–193 (2nd Feb. 1989); Nazarathy, M. et al., "Progress in Externally Modulated AM CATV Transmission Systems," *J. Lightwave Technol.* 11 (1):82–86 (January 1993)); and U.S. Pat. No. 5,420,868, issued to Chraplyvy et at., all of which are incorporated herein by reference.

Fabricating the laser and modulator separately, however, is inefficient and costly compared to an integrated modulator arrangement. Separate fabrication increases the overall size and complexity of the device and requires at least additional coupling fiber or optics between the laser and modulator.

Integrated modulators according to the second external modulation arrangement avoid the problems and inefficiencies associated with fabricating the laser and modulator as separate, discrete components. The electrical and optical interactions between the laser and modulator in an integrated modulator, however, are complex. See, for instance, the computer modeling of an integrated laser and electro-absorptive modulator discussed in Marcuse, D. et at., "Time-Dependent Simulation of a Laster-Modulator Combination," *IEEE J. of Quantum Electron.* 30 (12):2743–2755 (December 1994), which is incorporated herein by reference.

The complex optical and electrical interactions between the laser and modulator in an integrated laser-modulator combination make the reduction of chirp even more essential for these devices to be practical for optical communications systems. Because the laser and modulator are disposed in close proximity to one another on the same chip in an integrated laser modulator, it is more difficult to electrically and optically isolate the laser and the modulator from each other. See, the discussion of electrical and optical interactions in Suzuki, M. et al., "Electrical and Optical Interactions Between Integrated InGaAsP/InP DFB Lasers and Electroabsorption Modulators," *J. Lightwave Technol.* 6(6):779–784 (June 1988), which is incorporated herein by reference. In this 1988 Suzuki et al. article, RF bypass condensers can be connected to the laser to reduce electrical coupling. Such condensers increase cost and reduce the available chip space. High-quality anti-reflection (AR) coatings are provided on the end face of the modulator to reduce back reflections, but this too increases cost and complexity.

With respect to optical interactions, at present it is costly, if not impossible, to integrate an optical isolator on the same substrate with a laser and a modulator. Thus, one of the most effective ways of reducing chirp arising from back-reflected light in an external modulation arrangement (that is, placing an optical isolator in between the laser and modulator, as shown in the above-cited 1989 Suzuki et al. article) is unavailable for an integrated modulator.

What is needed then are further ways of reducing chirp occurring in external laser modulation. Chirp needs to be reduced in both cases of external modulation, where the laser and modulator are configured as separate, discrete devices and where the laser and modulator form an integrated modulator. Especially in the case of an integrated modulator, those optical interactions between the modulator and laser which give rise to chirp need to be reduced.

SUMMARY OF THE INVENTION

The present invention is a method and system for reducing chirp in optical communication and for providing a low-chirp modulated laser.

According to one embodiment of the invention, chirp is reduced in external modulation by decreasing pulse transition times in an information signal provided to a modulator. This embodiment applies to either type of external modulation arrangement where the laser and modulator are separate, discrete components or where they are fabricated as an integrated modulator. The inventors have found that decreasing pulse transition times reduces chirp in a modulated signal propagated along a dispersive optical medium.

In one implementation of this embodiment, a high-bandwidth driver is directly connected to the modulator to provide an information signal with pulses having decreased rising and falling pulse transition times.

In a second implementation of this embodiment, an electrical signal generator generates substantially rectangular-shaped pulses to form the information signal. The information signal is then high-pass filtered to decrease rising and falling pulse transition times.

Both of these implementations can be applied to a modulator fabricated as a separate, discrete component apart from the laser and to a modulator integrated in close proximity with the laser on a common chip.

According to a further feature of the invention, optical interactions between the modulator and laser in an integrated laser-modulator combination which give rise to chirp are reduced further by using a two-output modulator, rather than a conventional one-output modulator. Partial reflections at the exit faces of the two outputs cause the magnitude of light re-injected back into the laser to remain substantially constant. In this manner, chirp caused by fluctuations in the magnitude of the light re-injected from the modulator back into the laser is reduced.

Accordingly, by decreasing pulse transition times and using two complementary output parts, a low-chirp, integrated laser modulator is obtained which does not require accurate anti-reflection coatings or an optical isolator.

Further features and advantages of the present invention, as well as the structure and operation of various embodiments of the present invention, are described in detail below with reference to the accompanying drawings.

BRIEF DESCRIPTION OF THE DRAWINGS

FIG. 5a shows a DFB laser combined with an electro-absorption modulator. FIG. 5b shows a DBR laser having a grating end-reflector that separates it from the modulator.

FIGS. 8a–8c show light power at modulator output derived from driving the loss coefficient of the modulator with the ideal signal pulses shown in FIG. 6a. FIG. 8a shows the light power when signal pulses are filtered with $B_{sig}$=1.75 GHz. FIG. 8b shows the light power when signal pulses are filtered with $B_{sig}$=3 GHz. FIG. 8c shows the light power when signal pulses are filtered with $B_{sig}$=7.5 GHz.

FIG. 9a shows a nominal modulator length. FIG. 9b shows a modulator length increased by one quarter of a guided wavelength.

FIG. 10a shows a nominal modulator length. FIG. 10b shows a modulator length changed by one quarter of the guided wavelength.

FIG. 11a shows signal pulses filtered with $B_{sig}$=1.75 GHz. FIG. 11b shows signal pulses filtered with $B_{sig}$=3 GHz. FIG. 11c shows signal pulses filtered with $B_{sig}$=7.5 GHz.

FIG. 12a to 12c show eye diagrams obtained by letting the modulated light travel through 250 km of fiber with a dispersion of D=16 ps/(nm·km). FIG. 12a shows signal pulses filtered with $B_{sig}$=1.75 GHz. FIG. 12b shows signal pulses filtered with $B_{sig}$=3 GHz. FIG. 12c shows signal pulses filtered with $B_{sig}$=7.5 GHz.

FIGS. 13a to 13c show eye diagrams obtained by letting the modulated light travel through 500 km of fiber with a dispersion of D=ps(nm·km). FIG. 13a shows signal pulses filtered with $B_{sig}$=1.75 GHz. FIG. 13b shows signal pulses filtered with $B_{sig}$=3 GHz. FIG. 13c shows signal pulses filtered with $B_{sig}$=7.5 GHz.

FIG. 14 shows an eye diagram of unchirped pulses ($|r_3|^2$=0, $\alpha_{Hm}$=0) at the end of 500 km of fiber with D=16 ps/(nm·km). This eye corresponds to the input eye of FIG. 11a and shows how little distortion is caused by dispersion of unchirped pulses.

FIGS. 15a and 15b show eye diagrams for pulses that are chirped in the "opposite sense" according to FIGS. 9b and 10B. The signal pulses were shaped by a baseband filter with $B_{sig}$=3 GHz. FIG. 15a shows fiber length $L_f$=250 km. FIG. 15b shows fiber length $L_f$=500 km.

DETAILED DESCRIPTION OF THE PREFERRED EMBODIMENTS

Figure 1A:
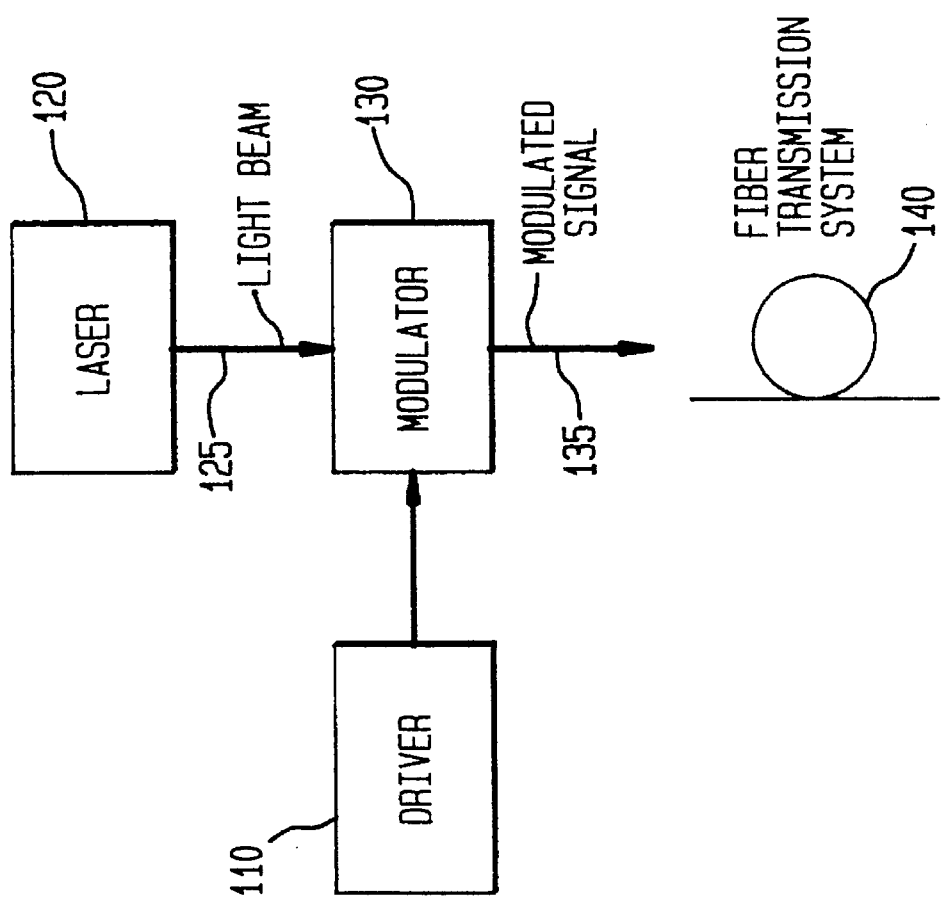
FIGS. 1a and 1b are block diagrams of an optical communication system according to two implementations of the present invention.

The present invention is described with reference to the accompanying drawings. In the drawings, like reference numbers indicate identical or functionally similar elements. Additionally, the left-most digit(s) of a reference number identifies the drawing in which the reference number first appears.

The present invention is described in terms of this example optical communications environment involving external modulation. Description in these terms is provided for convenience only. It is not intended that the invention be limited to application in this example environment. In fact, after reading the following description, it will become apparent to a person skilled in the relevant art how to implement the invention in alternative environments.

In this specification, "external modulation" is used to refer generally to both types of external modulation arrangements where the laser and modulator are separate, discrete components and where the laser and modulator form an integrated modulator. The terms "integrated modulator", "integrated laser modulator", "integrated laser-modulator combination," and similar equivalents thereof, are used interchangeably to refer to the external modulation arrangement where the laser and modulator are fabricated in close proximity on a common chip.

Shaped Modulation Signal Embodiment

According to the present invention, light passing through a modulator is modulated such that the pulse transition times in the output modulated light signal are reduced resulting in less chirp. For example, pulse transition times in the modulated light signal can be decreased such that rise and fall times are reduced to less than 25% of a bit period. This can be implemented using a driver and modulator combination operated at a high-bandwidth to decrease pulse transitions in the modulated light signal. Either a high-bandwidth driver and/or a high-bandwidth modulator can be used. A filter can likewise be incorporated in the driver to provide a shaped information signal. In this way, pulse transition times in the driving signal applied to the modulator are reduced which translates to decreased pulse transitions, i.e. sharper rising and falling edges in the modulated light signal as well. Each of these implementations will be now be described in further detail below with respect to FIGS. 1A and 1B.

FIG. 1A is a block diagram of an optical communication system 100 according to one implementation of the present invention. A laser 120 outputs a light beam 125 to a modulator 130. In this external modulation arrangement, the laser 120 and modulator 130 can be packaged as separate, discrete components or as an integrated modulator. A driver 110 drives the modulator 130 to provide a modulated signal 135 to fiber transmission system 140.

According to the present invention, chirp is reduced by using either a high-bandwidth driver 110 and/or a high-bandwidth modulator 130. Thus, a modualtor 130 can be used to provide a high-bandwidth modulation producing sharper pulses with reduced pulse transition times in the modulation signal 135. This high-bandwidth modulator 130 compensates for the inherent low pass filter effect of a modulator. For example, even with a standard driver 110, such as a NRZ signal generator operating at 2 Gbits/s, a modulator 130 having a 10 GHz bandwidth can be used to produce a modulated light signal 135 having decreased pulse transition times compared, for example, to a 2 GHz modulator.

Alternatively, a high-bandwidth signal generator can be used as driver 110 for providing a shaped information signal having reduced pulse transition times, i.e. sharper rise and fall times. Such a high-bandwidth driver 110 can further be used either alone or in combination with a high-bandwidth modulator 130 to reduce chirp. The high-bandwidth driver 110 for reducing pulse transitions in the driving signal applied to the modualtor 130, which in turn reduces pulse transitions in the modulated light signal 135, will be further described with respect to FIG. 1B.

Figure 1B:
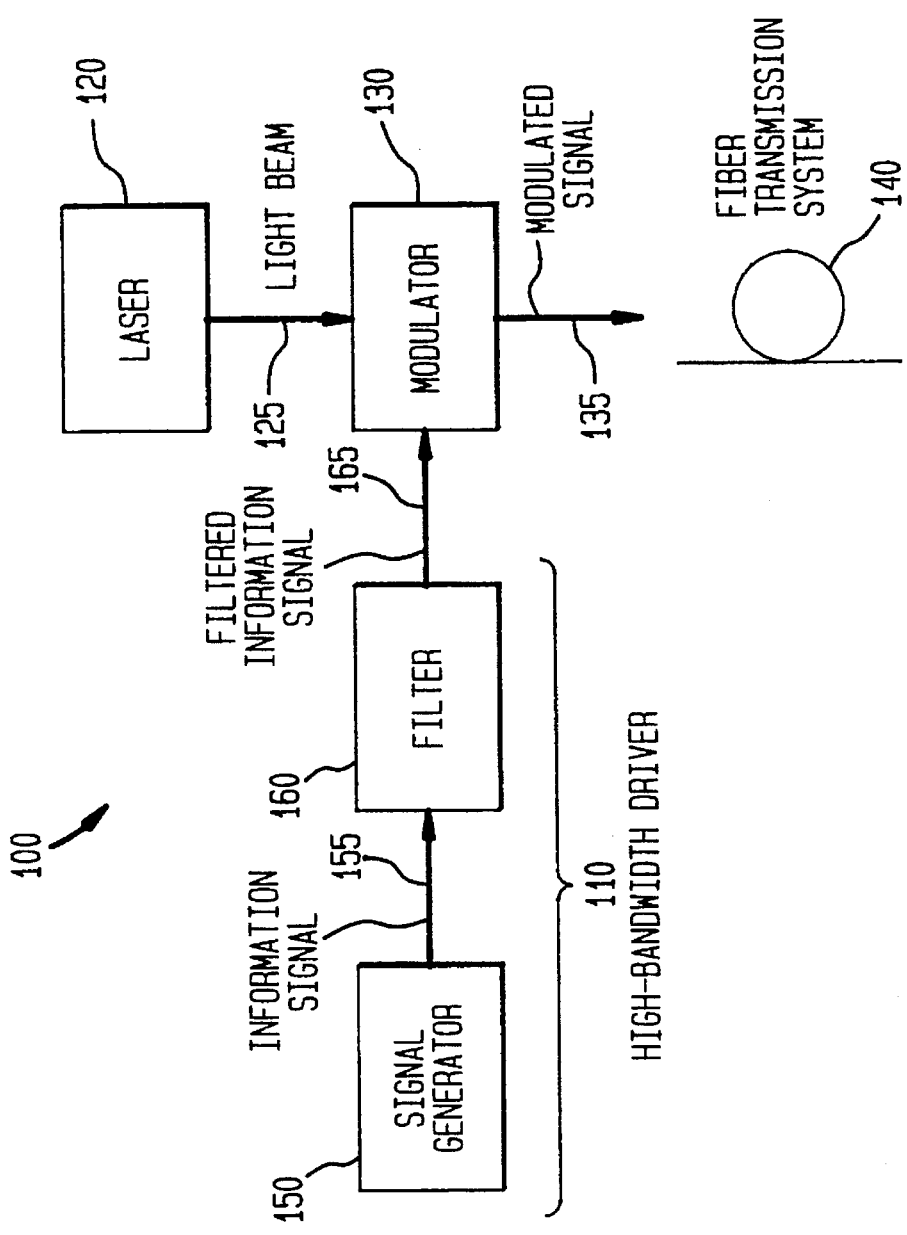

In FIG. 1B, a high-bandwidth driver 110 drives the modulator 130 to provide a modulated signal 135 to fiber transmission system 140. According to another implementation of the present invention, then, high-bandwidth driver 110 consists of a signal generator 150 for generating a pulsed information signal 155 and includes a filter 160. Filter 160 filters the information signal 155 to decrease pulse transition times and/or flatten the pulse tops and bottoms. A filtered information signal 165 is then output to the modulator 130 for generating the modulated signal 135.

Alternatively, in another implementation of the present invention, the signal generator 150 can provide a high-bandwidth shaped information signal directly to the modulator 130 without use of a separate filter 160.

As discussed above, the inventors have discovered that chirp is reduced by shaping the information signal to reduce pulse transition times. Filtering or providing a high bandwidth driver further counteracts chirp, i.e., excessing spectral broadening, imparted by the modulator. The resultant modulated signal 135 can then propagate through a dispersive optical medium for greater distances with less pulse distortion. Accordingly, the present invention is well-suited for optical communication systems utilizing Erbium-doped fiber amplifiers for long-haul, high bit-rate applications.

Figure 2:
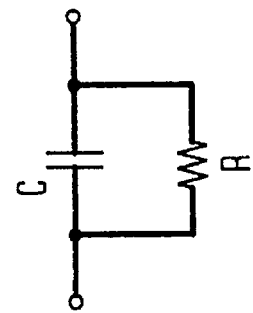
FIG. 2 shows an example of a filter according to the present invention.

Regarding the high-bandwidth driver 110, signal generator 150 can constitute a non-return to zero NRZ drive circuit for producing rectangular-shaped pulses. Filter 160 is a high-pass filter such as a well-known RC circuit as shown in FIG. 2. Alternatively, a high-bandwidth NRZ signal generator could provide a shaped information signal 165 directly to the modulator 130. Other driver and filter arrangements for producing a shaped information signal having sharp rise and fall times and/or flat pulse tops and bottoms would be clearly within the purview of one skilled in the art.

Thus, contrary to the smoothing of pulse transitions of drive pulses for a directly-modulated laser in the Bickers and Westbrook article, the present invention relates to sharpening pulse transitions of the information signal applied to the modulator in an external modulation approach. As a result, even if the Bickers and Westbrook pulse smoothing technique for direct laser modulation were to be applied to external modulation, it only teaches directly away from what the inventors have discovered, namely, that chirp is reduced by shaping modulation pulses so as to decrease pulse transition times and create sharp rising and falling edges.

Finally, in the implementations of FIGS. 1A and 1B, laser 120 can be an integrated distributed feedback DFB or Bragg reflection DBR laser and modulator 130 can be an electro-absorption modulator, such as a multiple-quantum well modulator. See, e.g., Wood, T. H., "Multiple Quantum Well (MQW) Waveguide Modulators," *J. Lightwave Technol.* 6(6):743–757 (June 1988), incorporated herein by reference. Other well-known types of integrated laser and modulator combinations can be used. In this manner, compared to known integrated modulator arrangements, the modulator 130 and laser 120 according to the present invention can be fabricated as a low-chirp, integrated modulator with less excessive broadening of the spectral width beyond that required for modulation.

In addition to decreasing pulse transition times in resultant modulated light signal, chirp arising from the optical interactions in an integrated modulator can be further reduced by using two complementary output ports, as described in the examples below and in applicants' co-pending application incorporated by reference above.

Two Port Integrated Modulator

According to a further feature of the present invention, optical interactions giving rise to chirp in an integrated laser modulator are reduced by utilizing a modulator having at least two ports at the exit face, as found in a 1×2 or 2×2 coupling switch. Heretofore, two-output port modulators, for instance, Balanced Bridge Interferometers and 1×2 or 2×2 directional coupler, have only been practically available in external modulation arrangements where the modulator is separate from the laser source as discussed with respect to FIG. 6 of the Nazarathy et al. article.

By using two output ports in the integrated modulator, when the exit face reflection at each output port is approximately the same, the magnitude of light re-injected to the laser will remain substantially constant regardless of the voltage applied to the modulator. Because the amount of chirp depends upon fluctuations in the power of re-injected light, maintaining the magnitude an/or phase of re-injected light substantially constant over time reduces chirp.

In this manner, as described further in applicant's co-pending application incorporated by reference above, a low-chirp integrated laser modulator can be fabricated which reduces those optical interactions between the modulator and laser which give rise to chirp even without the need for accurate anti-reflection coatings or an optical isolator.

Figure 3:
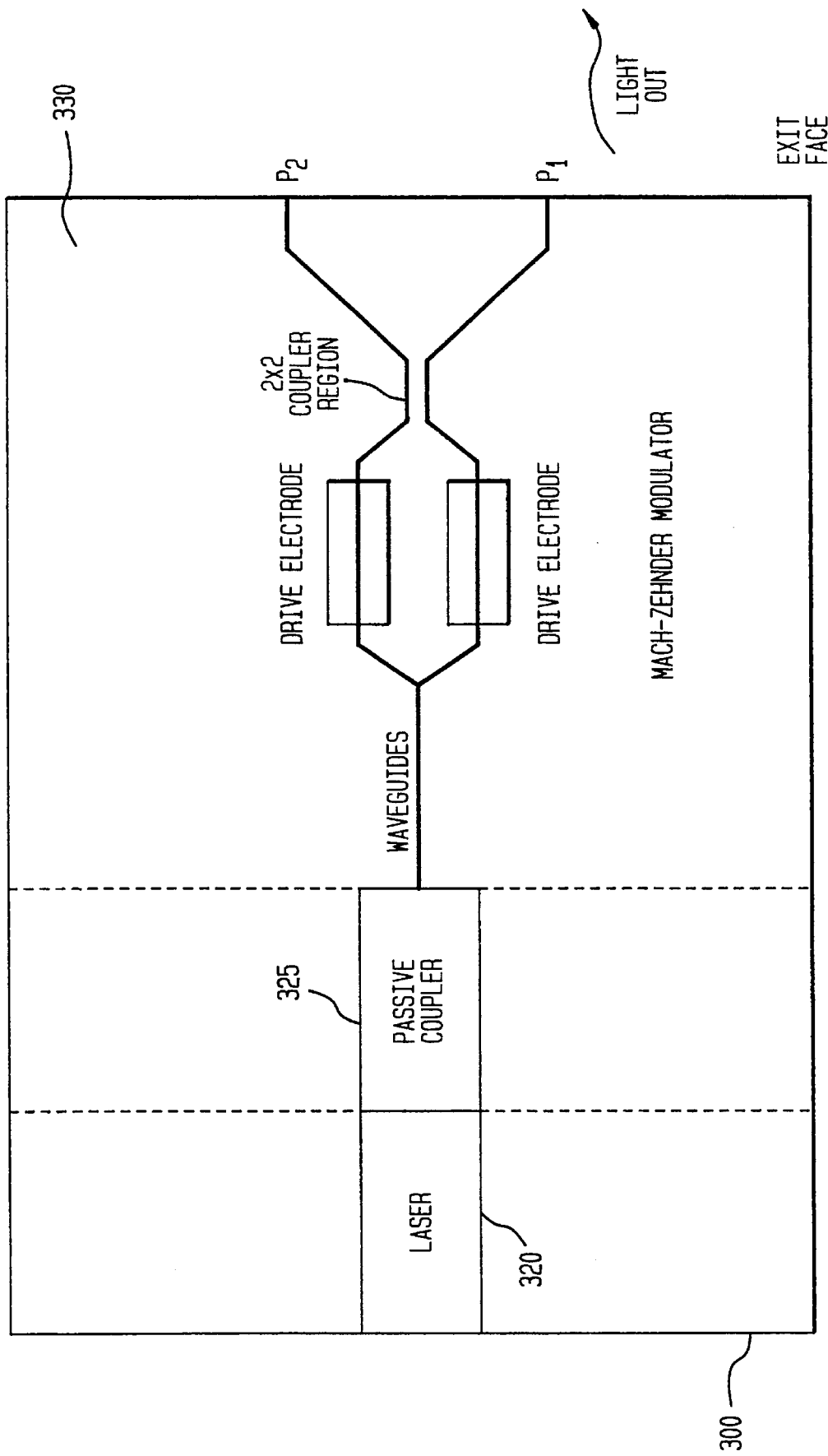
FIG. 3 shows a first two port integrated modulator according to the present invention.

FIG. 3 shows a first example of a low-chirp integrated modulator for use in the present invention. Laser 320 and modulator 330 are integrated on the same substrate 300. A passive coupler 325 couples light from laser 320 to modulator 330.

Modulator 330 consists of a Mach-Zehnder interferometer portion optically coupled through a 2×2 coupler region to two ports P1 and P2 outputting complementary output signals. Each port P1 or P2 can be further coupled to a respective fiber transmission system or receiver (not shown). For simplicity, light is shown in FIG. 3 only exiting from port P1; however, it would readily apparent to one of ordinary skill in the art that light from both ports can be used to provide complementary data to a common optical receiver or to separate optical receivers.

Drive voltages are applied to the drive electrodes of the modulator to modulate the light. Such voltages are provided to the drive electrodes by a modulator driver (not shown). For example, a high-bandwidth driver 110 as discussed with respect to FIG. 1 can be coupled to the drive electrodes. Light reflects from each exit face of the two output ports and re-combines in the modulator such that the magnitude and/or phase of re-injected light passing back to the laser is maintained substantially constant over time, regardless of the drive voltages applied to the modulator. In this manner, chirp in the emitted modulated laser signal is reduced.

Figure 4:
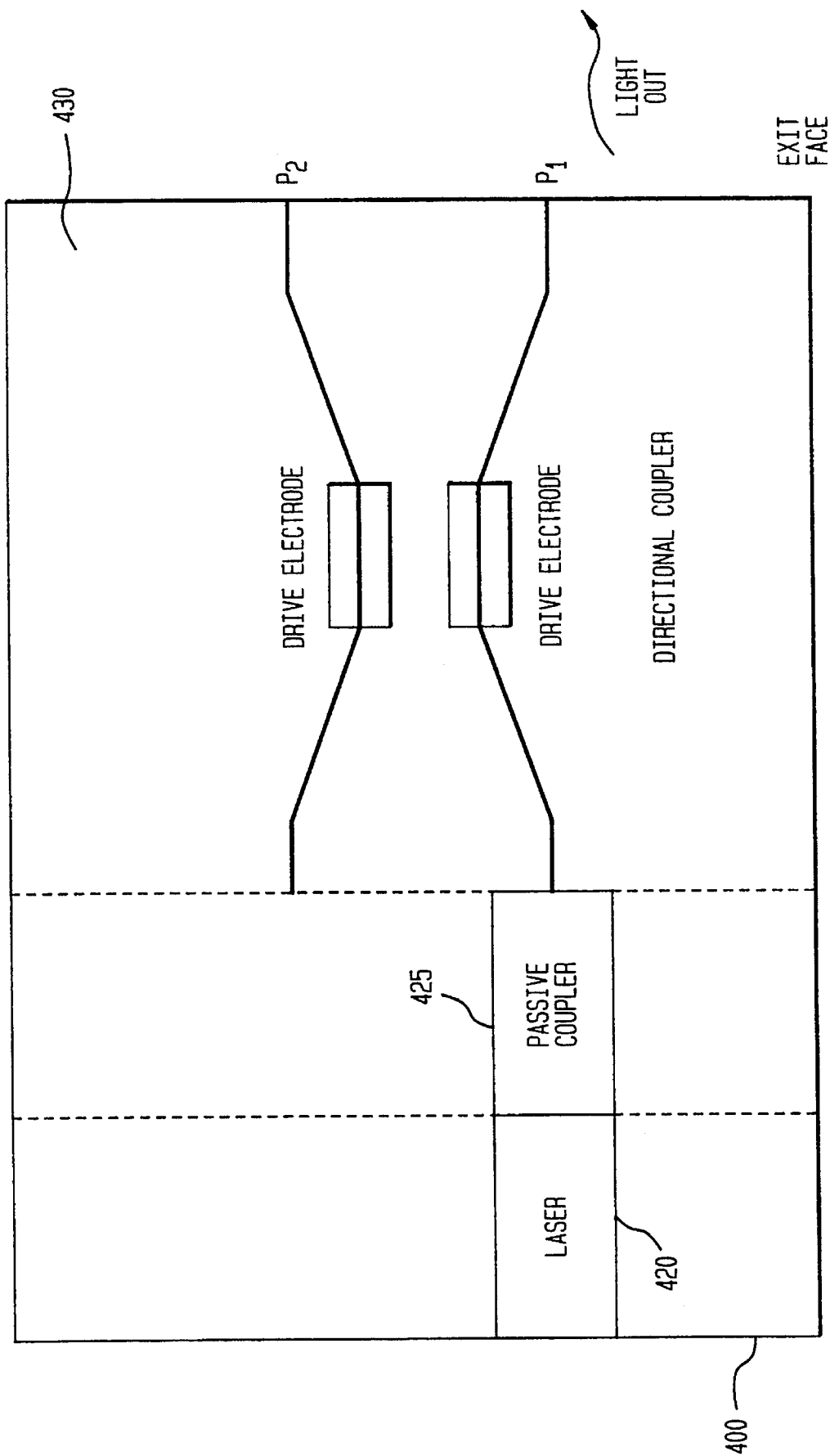
FIG. 4 shows a second two port integrated modulator according to the present invention.

FIG. 4 shows a second example of a low-chirp integrated modulator for use in the present invention. Laser 420 and modulator 430 are integrated on the same substrate 400. A passive coupler 425 couples light from laser 420 to modulator 430.

Modulator 430 consists of a 2×2 directional coupler having two ports P1 and P2 outputting complementary optical signals. Each port P1 or P2 can be further coupled to a respective fiber transmission system or receiver (not shown). For simplicity, light is shown in FIG. 4 only exiting from port P1; however, it would be apparent to one of ordinary skill in the art that light from both ports can be used to provide complementary data to a common optical receiver or to separate optical receivers.

Drive voltages are applied to the drive electrodes of the modulator to modulate the light. In the operation of the directional coupler, input light is switched depending on the voltage at the drive electrodes, to provide complementary modulated output signals at ports P1 and P2. The optical paths through the coupler are such that light reflected at the exit face is recombined in the modulator to maintain a substantially constant magnitude and/or phase of light re-injected back to the laser, regardless of the voltage applied to the directional coupler. In this manner, chirp in the emitted modulated laser signal is reduced.

Simulations

Briefly, in simulations testing an integrated modulator according to the present invention, the distortion from chirp was observed to be reduced for 2.5 Gb/s NRZ signals when filtered at 7.5 GHz to produce sharper, flat topped pulses having decreased transition times, as compared to the smoother pulses caused by filtering at 3.0 and 1.75 GHz.

In particular, the inventors explored the performance of an NRZ pulse-driven laser-modulator by using the earlier mathematical model described in the Marcuse et al. 1994 article to generate simulated light pulses and observe their distortion in lightwave systems of varying overall dispersion. The resulting pulse distortion is displayed in the form of eye diagrams.

Figure 5A:
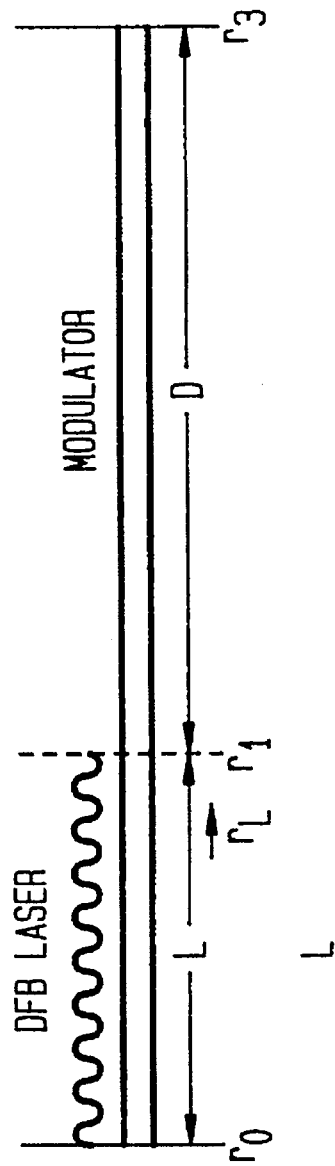
FIGS. 5a and 5b show schematics of laser-modulators modeled in a simulation of the present invention.
Figure 5B:
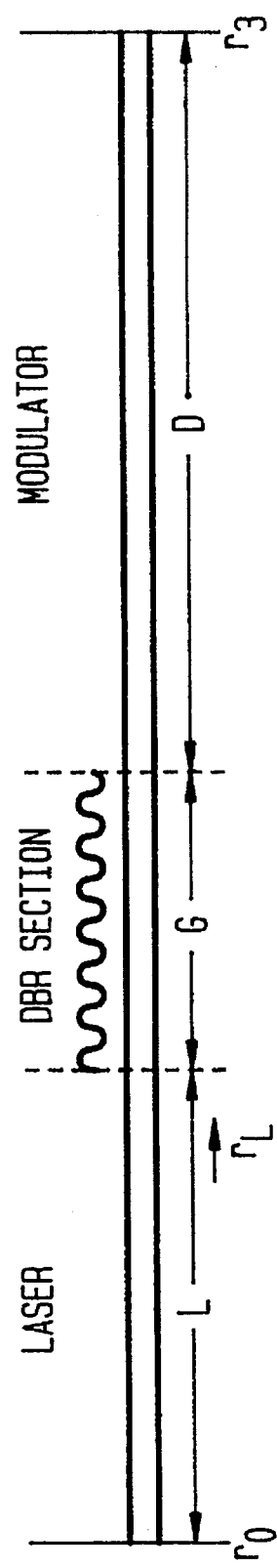

The internal feedback mechanism of the laser was modeled as either distributed feedback (DFB) or as Bragg reflection (DBR). Most calculations were performed for a OFB laser. Similar results would be expected for a DBR laser model. The modulator was modeled as an electro-absorption device whose loss coefficient is forced to follow the time evolution of the baseband signal source. Both types of laser-modulators are shown schematically in FIG. 5. Electrical leakage between the laser and modulator sections is not included in these simulations; the laser and the modulator sections are assumed to be perfectly isolated.

The principal result of this study is the observation that the distortion of chirped pulses depends strongly on the shape of the input pulses. Since the spurious frequency modulation of the laser due to optical feedback follows closely the shape of the signal, pulses with flat tops experience a frequency deviation that tends to be constant over the duration of each pulse so that all pulses travel at the same group velocity even though their frequencies are shifted from the nominal carrier frequency. In the spaces between pulses the frequency shift is different so that these regions travel at a different group velocity. However, for pulse modulation with a high extinction ratio this does not lead to serious pulse distortion. However, if the pulses are more rounded, the frequency shift varies during the duration of each pulse so that in a dispersive fiber the speed of different portions of each pulse varies due to dispersion. This can lead to severe pulse distortion limiting the achievable transmission distance.

NRZ Pulse-Driven Laser-Modulator

The numerical values used for most of the constants used in the calculations reported here are listed in the appendix.

Figure 6A:
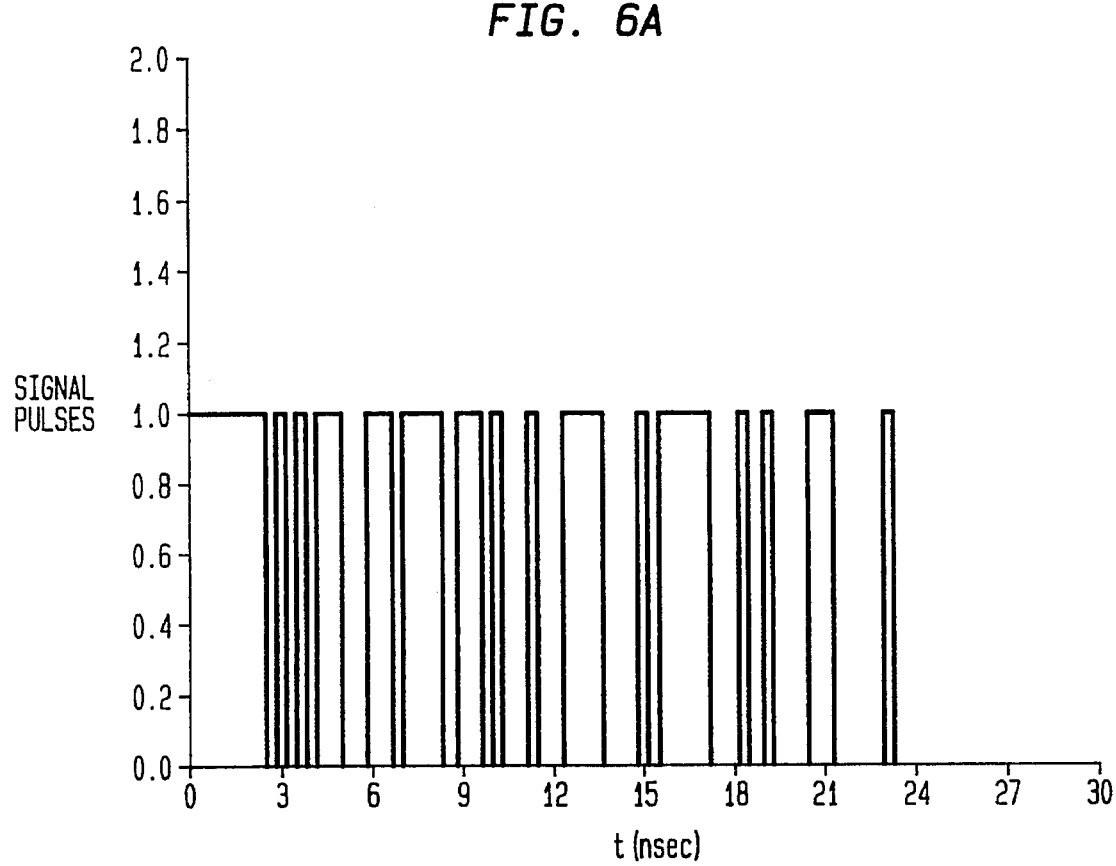
FIG. 6a shows ideal square pulses forming a 64 bit 2.5 Gb/s pseudorandom sequence.
Figure 6B:
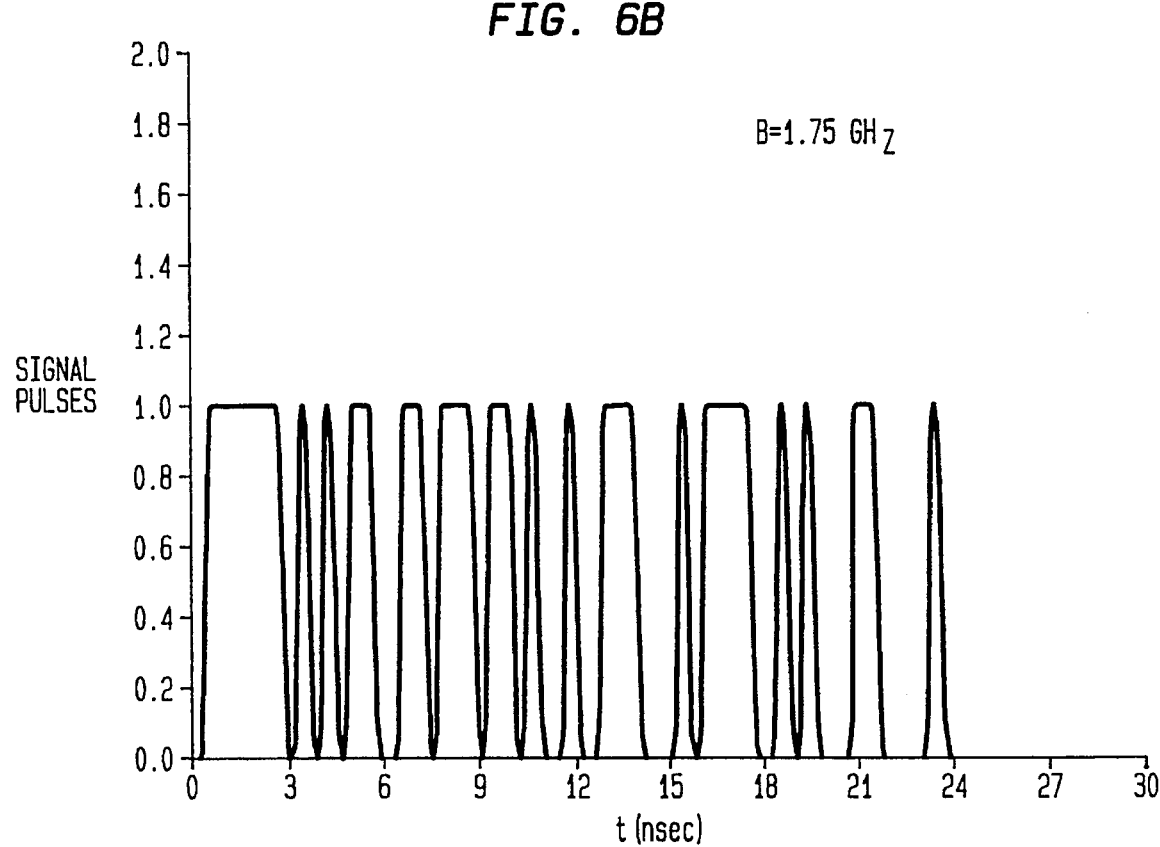
FIG. 6b shows the ideal pulses of FIG. 6a filtered with a Bessel filter of order 20 and a baseband bandwidth $B_{sig}$=1.75 GHz.

In the simulation a pseudorandom NRZ pulse sequence was generated consisting of rectangular waveforms as shown in FIG. 6a. The 64 bits of 2.5 Gb/s pulses cover the range from 0 to 25.6 nsec. The horizontal scale of FIG. 6a and several subsequent figures is extended to 30 nsec for cosmetic reasons. Since physical signal generators do not produce exact rectangular pulses, this pulse sequence passes through a simulated Bessel filter of order 20 and varying baseband bandwidth, $B_{sig}$, to round its edges and give it a more realistic appearance. FIG. 6b shows the filtered pulses for $B_{sig}$=1.75 GHz. The temporal shifts of the pulse trains of FIGS. 6a and 6b relative to each other are caused by the phase response of the filter.

To make the shape of the individual pulses more visible, FIG. 7 shows them on an expanded horizontal scale. The apparent small steps on the slopes of the rectangular pulses in FIG. 7a are an artifact of the display. FIGS. 7b and 7d show individual pulses that are filtered with $B_{sig}$=1.75, 3 and 7.5 GHz, respectively. The signal waveforms s(t) are used to modulate the amplitude loss coefficient of the modulator according to the formula $$\alpha(t)=\alpha_0+\alpha_1^*[1-s(t)] \quad (1)$$

The power transmission coefficient, T(t), of the modulator of length $L_m$ is given by $$T(t)=e^{-2\alpha(t)Lm} \quad (2)$$

Since the signal pulses, s(t), have a low value of 0 and a high value of 1, $\alpha_0$ in (1) is the low loss value at the top of the pulse train in FIG. 6B while $\alpha_1$ is the high loss value at the bottom of the pulse train. This is the reason why 1−s(t) instead of s(t) is used in (1) since the absorption modulator inverts the bit pattern.

It should be understood that the filtering operation of the signal used in the simulation is simply intended to produce more or less rounded pulses. This procedure is not intended to simulate an actual physical signal generator. Likewise, the modulator used in the simulation is idealized in that it has infinite bandwidth. The shape of the output pulses is determined by the shape of the filtered input pulses and by the transfer function of the modulator as defined by equation (2).

Figure 7A:
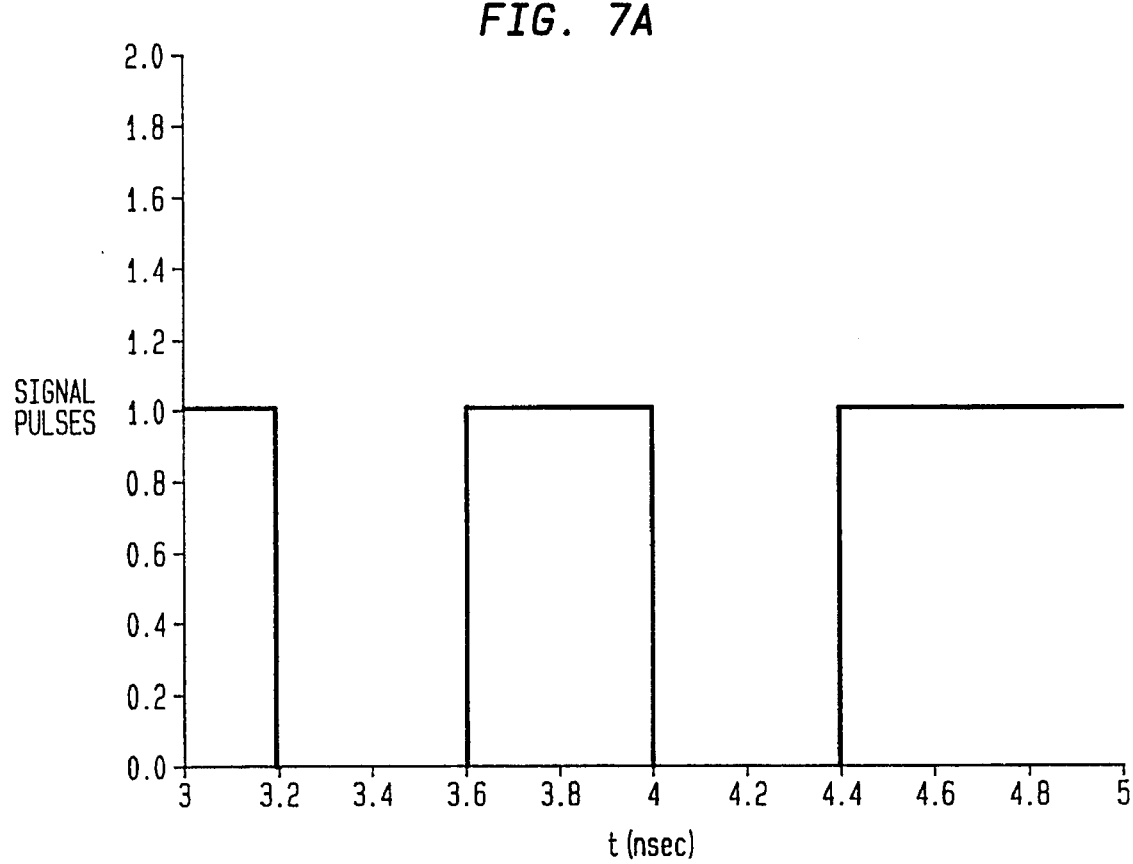
FIG. 7a shows a short segment of the ideal signal pulse sequence shown in FIG. 6a showing individual pulses more clearly.
Figure 7B:
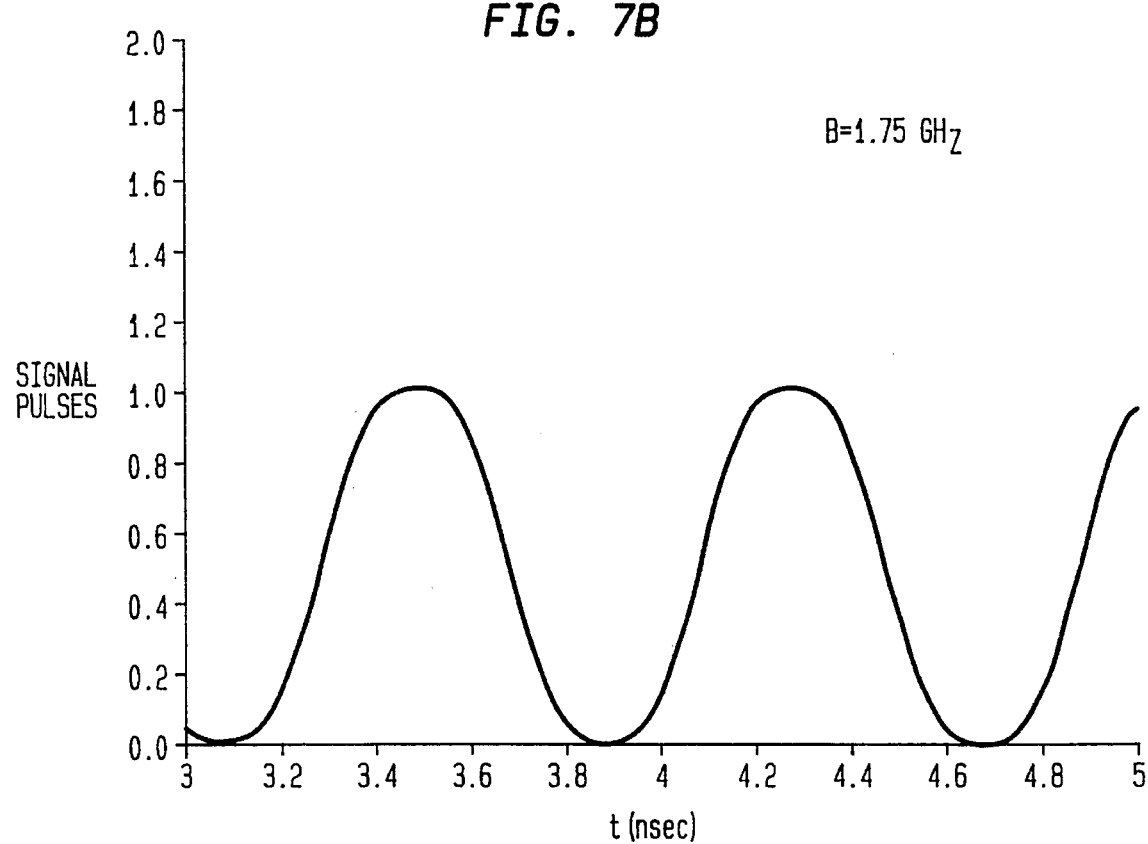
FIG. 7b shows pulses filtered with $B_{sig}$=1.75 GHz.
Figure 7C:
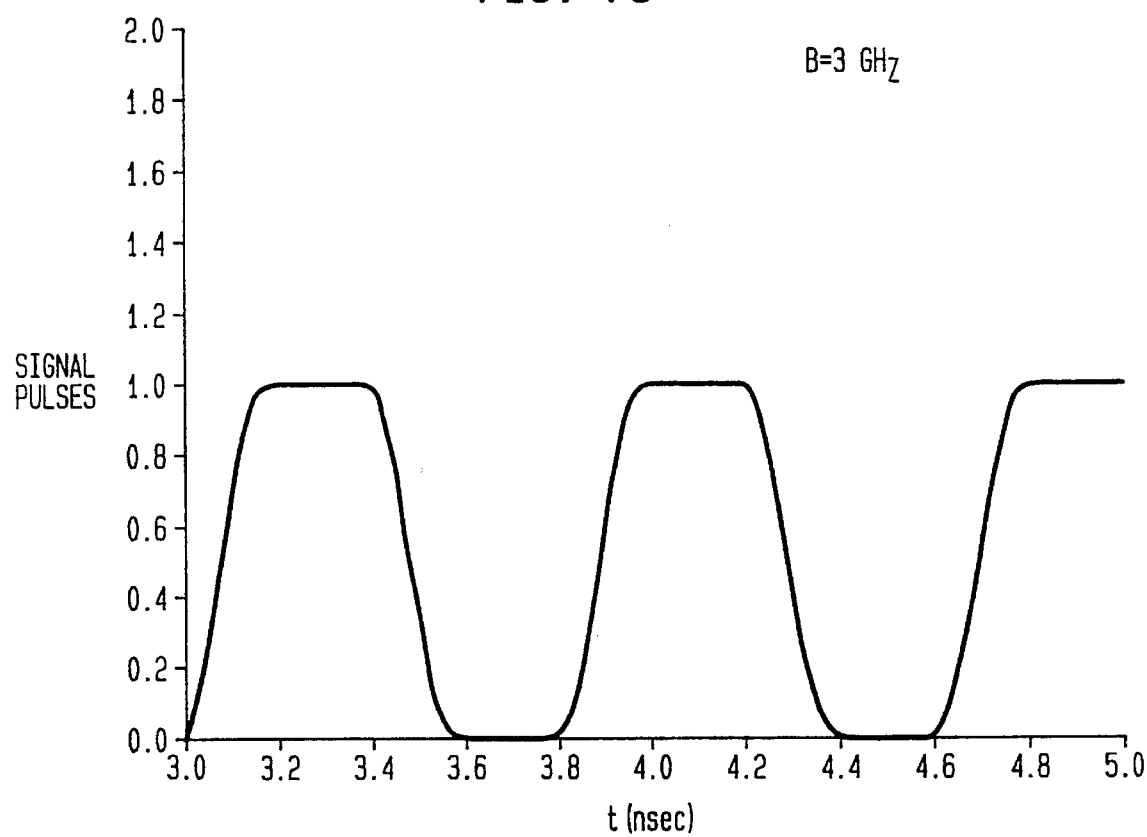
FIG. 7c shows pulses filtered with $B_{sig}$=3 GHz.
Figure 7D:
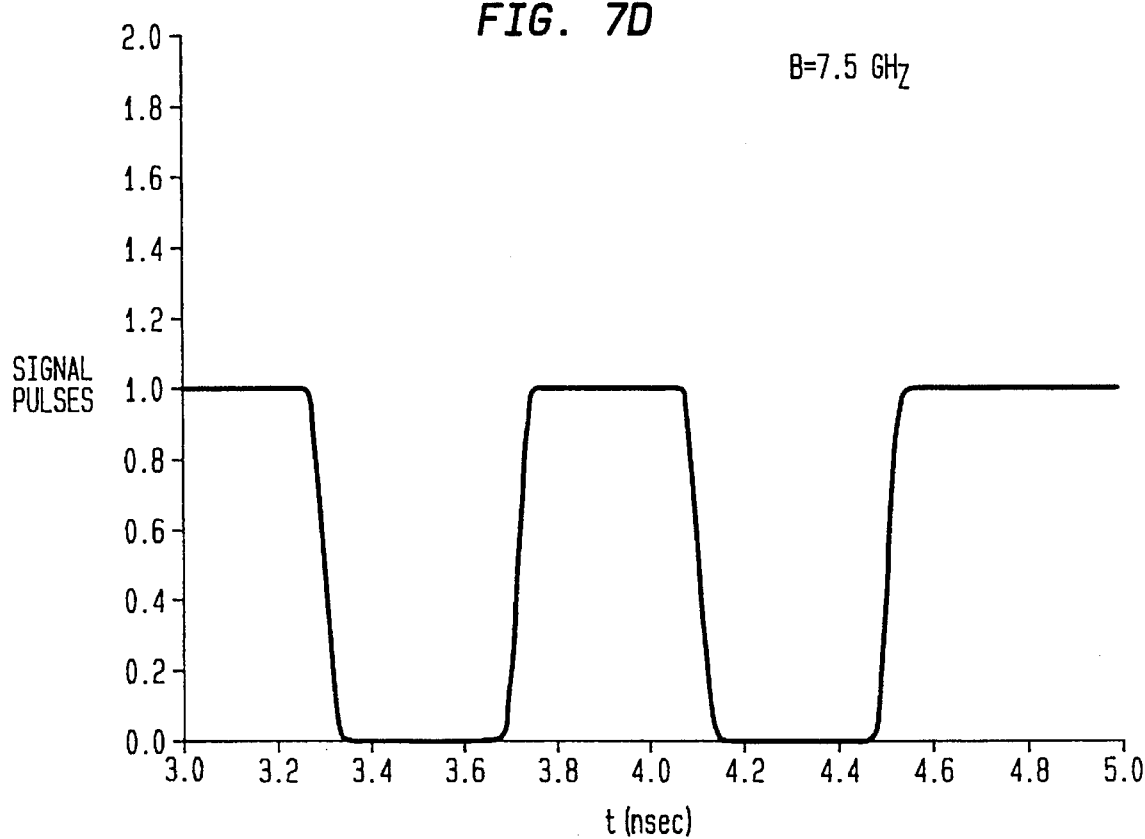
FIG. 7d shows pulses filtered with $B_{sig}$=7.5 GHz.
Figure 8A:
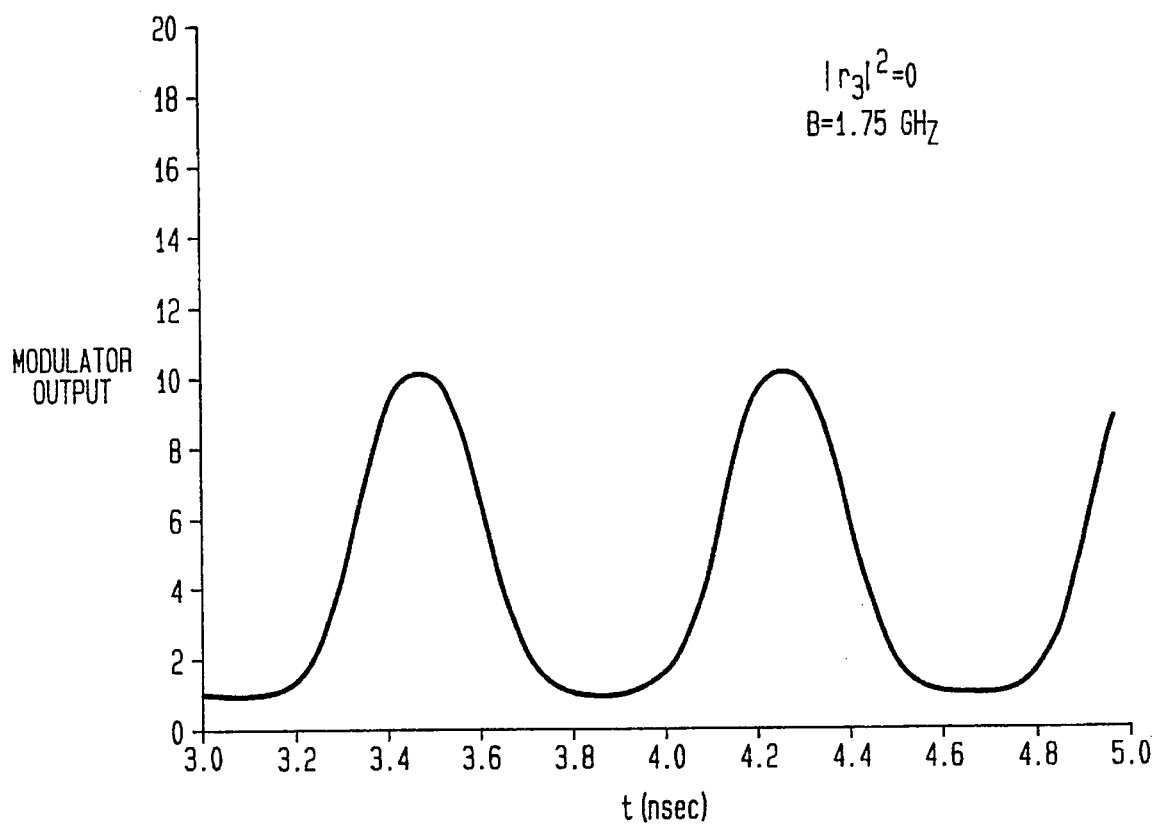
Figure 8B:
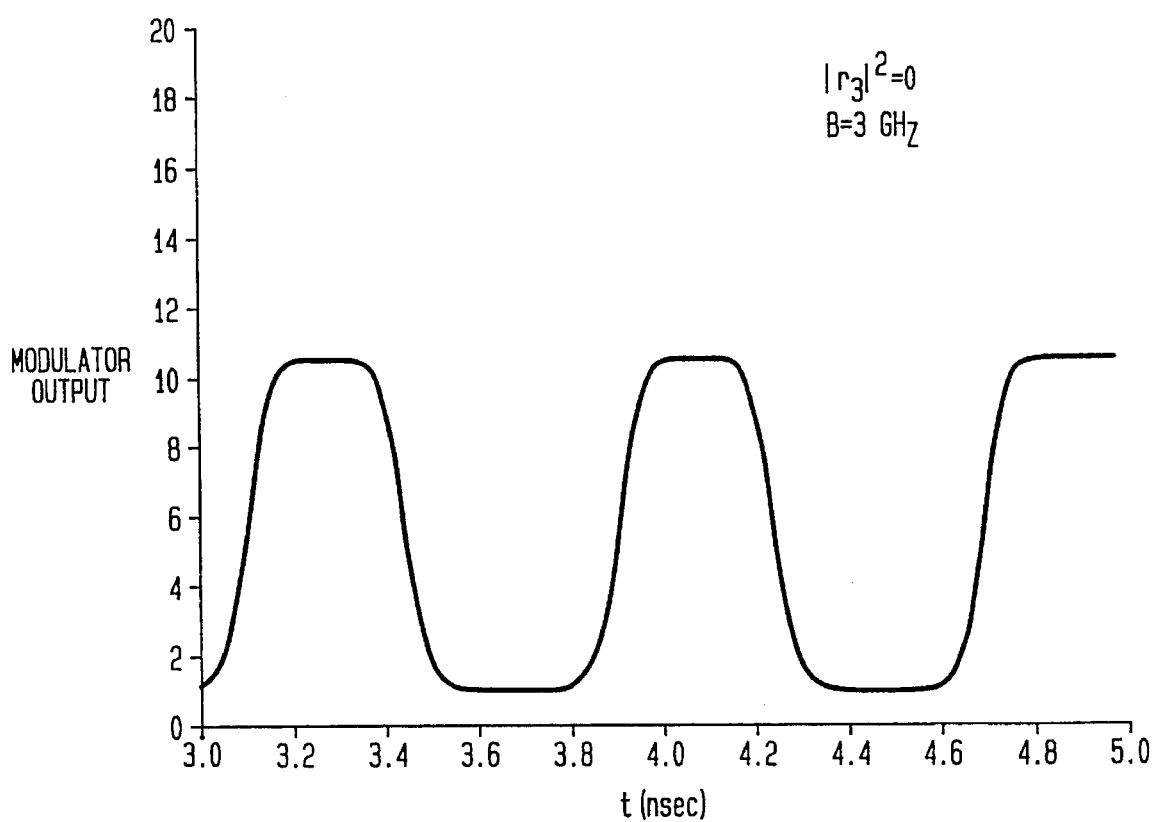
Figure 8C:
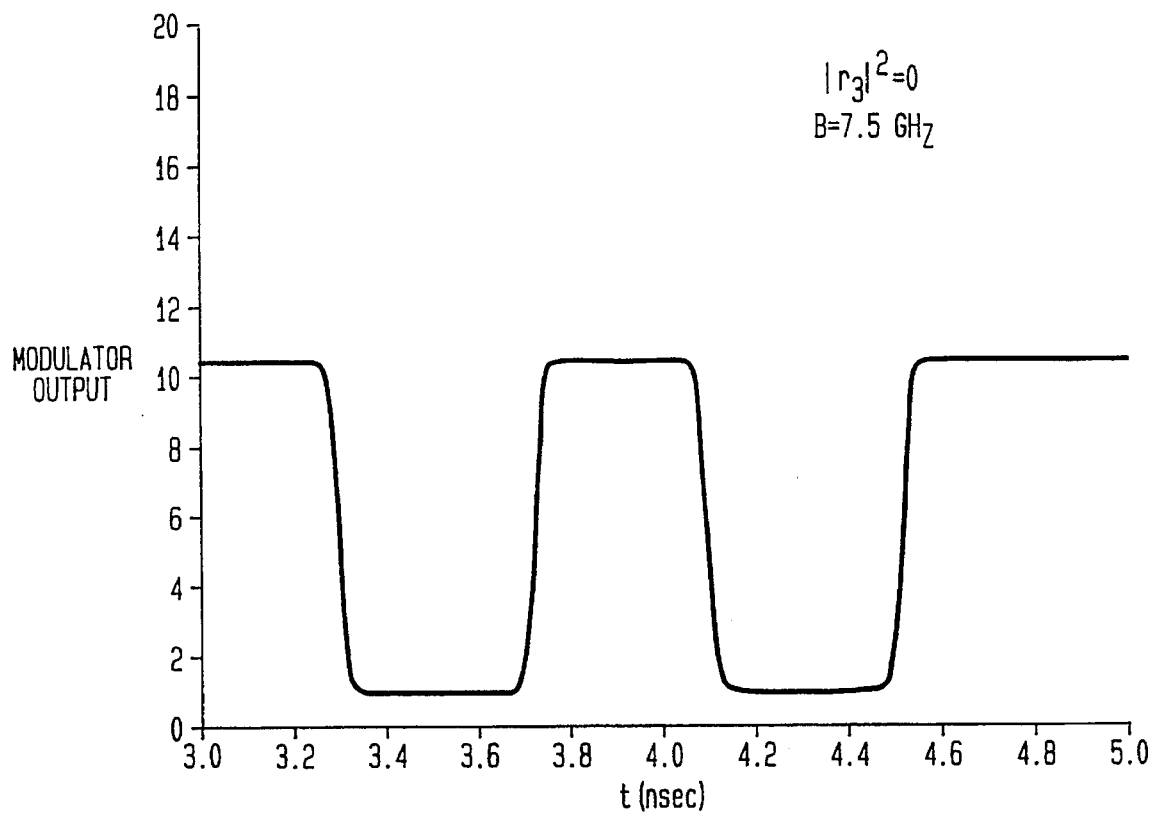

The output of the modulator in response to the signal pulses displayed in FIGS. 7b and 7d are shown in FIGS. 8a through 8c. The distortion of the pulses caused by the modulators response function (2), most clearly seen by a comparison of FIGS. 7b and 8a, becomes less noticeable as the slopes of the signal pulses become steeper. The modulator output pulses displayed in FIGS. 8a through 8c were computed for vanishing end-facet reflectivity, $|r_3|^2$=0. In this case them is no optical feedback so that laser and modulator are uncoupled and the laser operates at a single frequency.

This situation changes if the end-facet of the modulator reflects some of the optical power. In that case, the combination of laser and modulator acts as a compound cavity and the laser frequency depends on the loss and the optical path length of the modulator. The dependence of the laser chirp on the length of the modulator has been explored in the Marcuse, D. et al. article cited earlier.

Figure 9A:
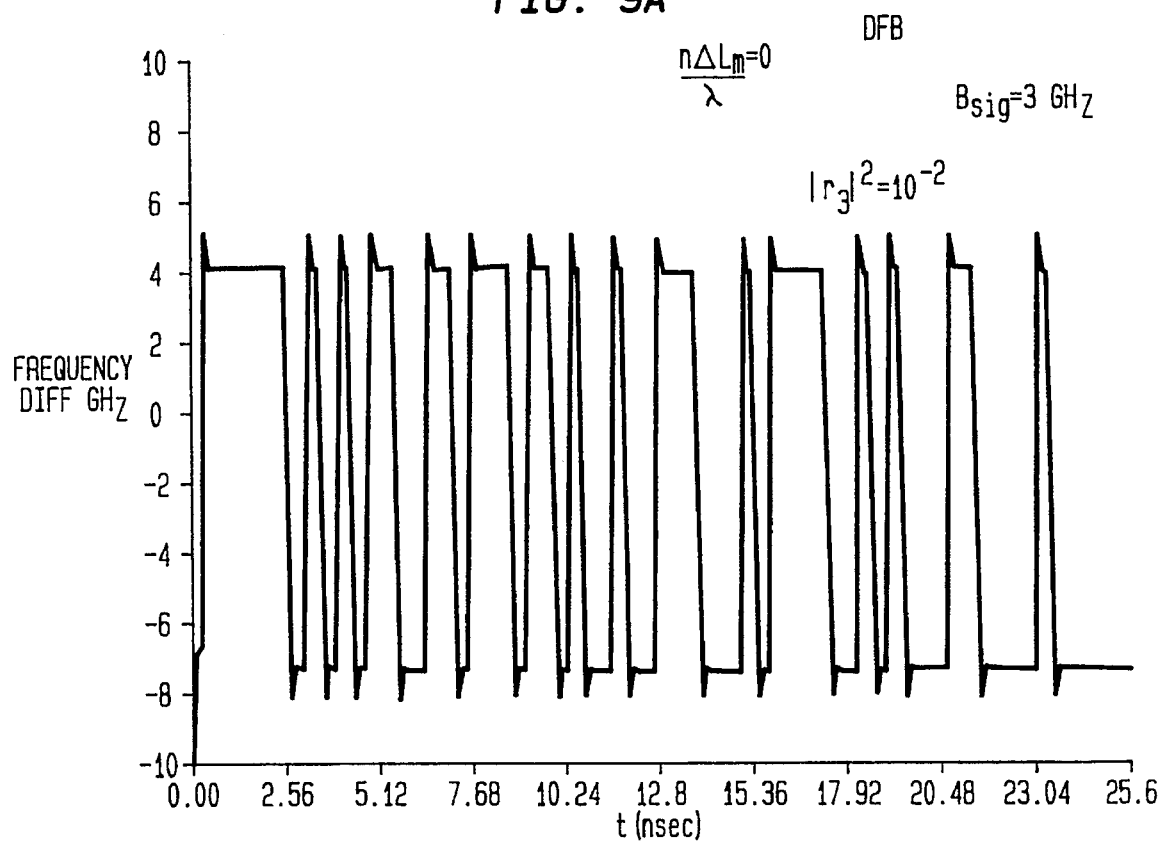
FIGS. 9a and 9b show frequency deviation of the laser caused by optical feedback from the modulator with an end-facet reflectivity $r_3^2$=0.01.

FIG. 9a shows the frequency deviation of the laser for an end-facet reflectivity of $|r_3|^2$=0.01 and for an input signal that was filtered with a baseband bandwidth of $B_{sig}$=3 GHz. Except for an initial overshoot at the onset of each pulse, the instantaneous frequency deviation of the laser follows the modulation perfectly. As expected, the amount of frequency deviation depends on the length of the modulator with a periodicity whose period corresponds to half the guided light wavelength.

It is interesting to observe that not only the magnitude but also the sign of the frequency deviation is length-dependent. The frequency plot in FIG. 9b was calculated by changing the length of the modulator by one quarter of the wavelength of the guided wave. It is obvious that the sign of the frequency deviation has changed so that it is now out-of-phase with the driving signal. The frequency chirp of the laser can also be seen clearly in the optical spectrum of the modulator output, FIGS. 10a and 10b. The sharp peaks in the optical power spectrum correspond to the flat portions of the time functions of the frequency deviation in FIGS. 9a and 9b. The large spike in the spectrum corresponds to the frequency deviation that coincides with the peak of the pulse.

Pulse Distortion of Chirped NRZ Pulses in Dispersive Optical Fibers

Figure 11A:
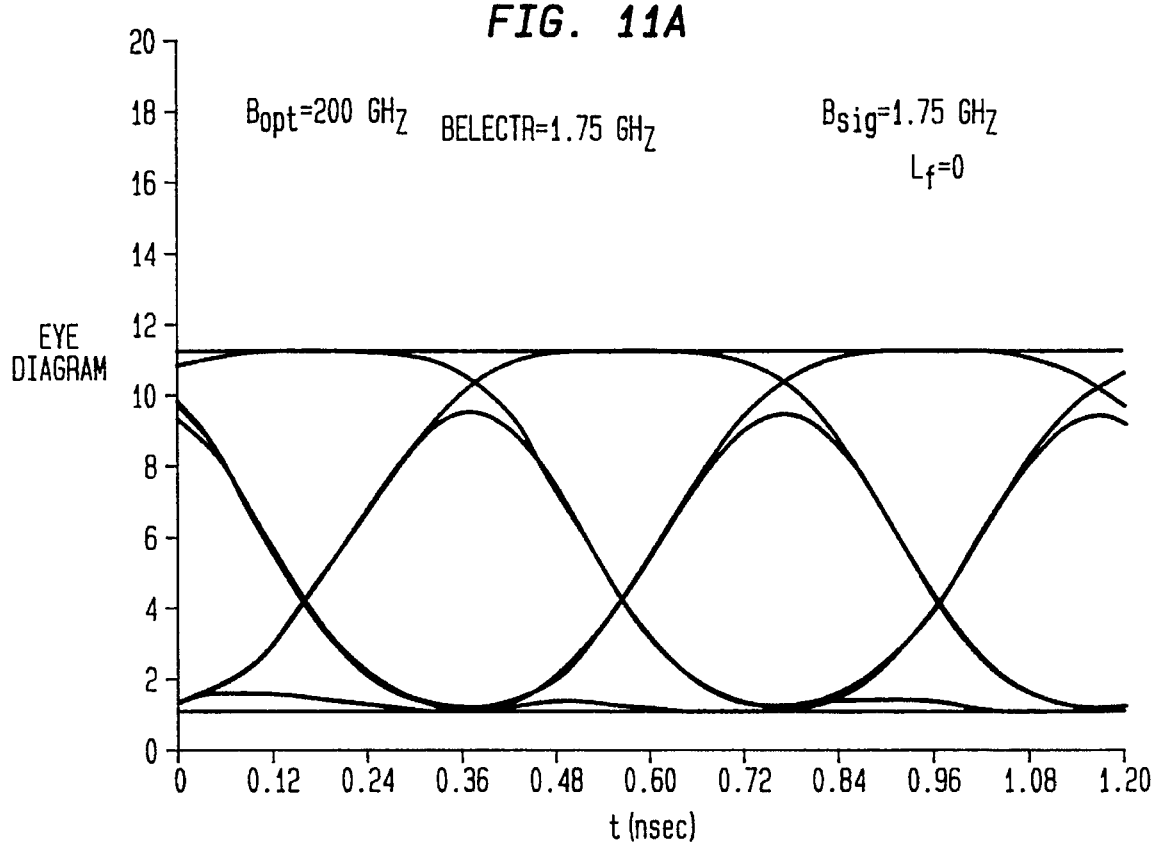
FIGS. 11a to 11c show input eyes computed from light at the modulator output.
Figure 11B:
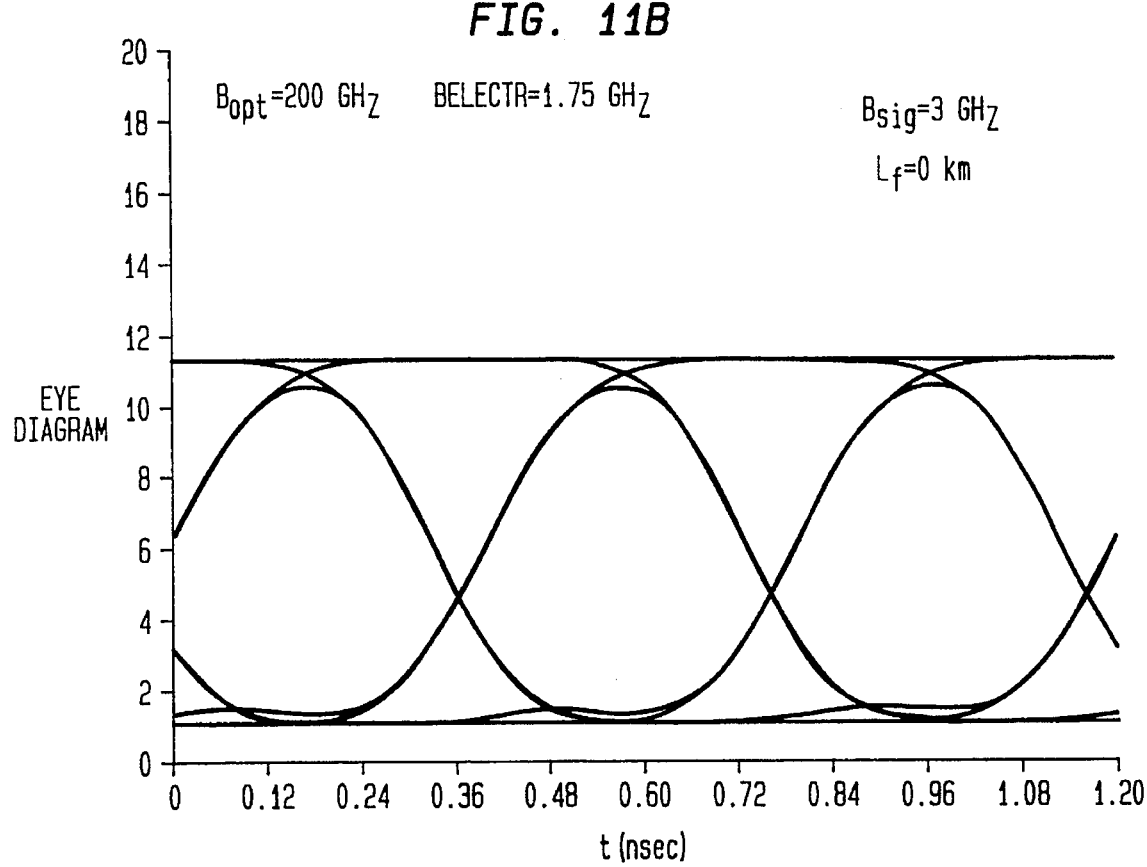
Figure 11C:
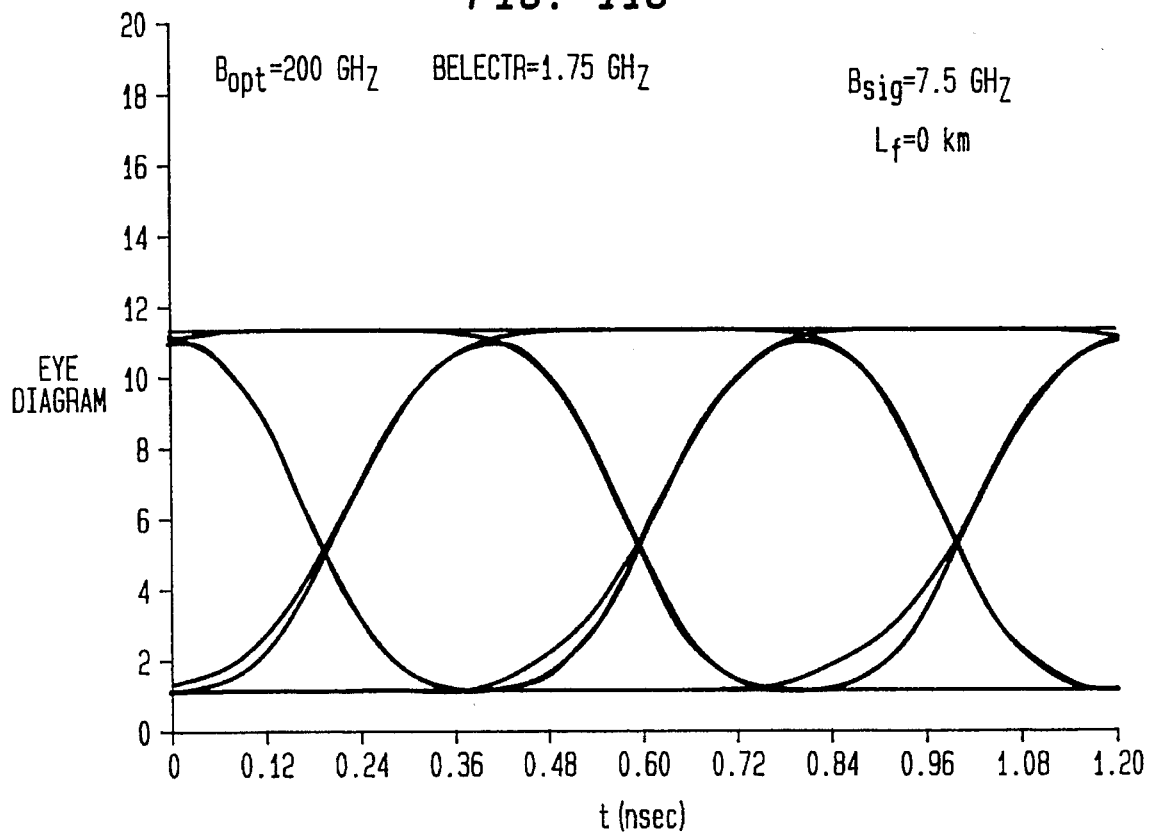

The actual pulse distortion is evident in FIGS. 11a through 11c which are eye diagrams at the fiber input for the NRZ pulse train of FIG. 6, shaped by a low-pass filters of bandwidths $B_{sig}$=1.75, 3 and 7.5 GHz. The detected pulses were all filtered by a baseband Bessel filter (of order 10) with $B_{rcvr}$=1.75 GHZ bandwidth. The eye openings become larger for increasing values of $B_{sig}$ because of the distorting influence of the modulator. There is a single spurious trace near the bottom of the eye diagrams, FIGS. 11a through 11c, that is caused by a laser transient affecting the first pulse when the pulse train is switched-on.

Figure 12B:
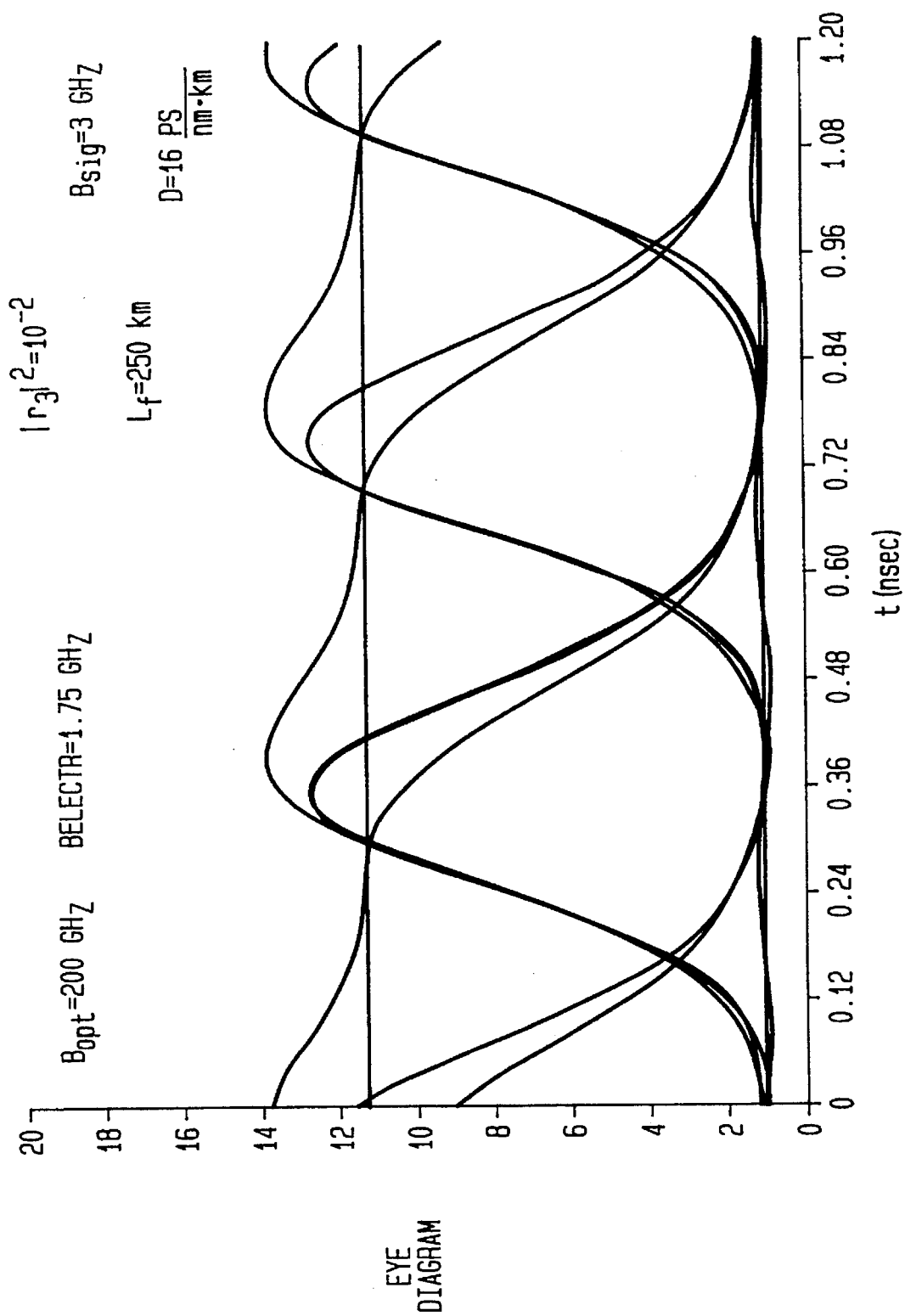

FIGS. 12a through 12c show eye diagrams computed at $L_f$=250 km. It is remarkable how much the eye opening depends on the shape of the input pulses. For pulses that are rounded by filtering with a filter of bandwidth $B_{sig}$=1.75 GHz, the eye at $L_f$=250 km has deteriorated to the point that low error rates may no longer be achievable. On the other hand, the eye shown in FIG. 12c, produced by input pulses that are shaped by a low-pass filter with $B_{sig}$=7.5 GHz, is wide open. The eye in FIG. 12b, shaped by $B_{sig}$=3 GHz is somewhere in between. This comparison shows that for a laser whose chirp is closely tied to the shape of the modulating signal it is desirable to use sharp pulses that are as nearly rectangular as possible.

Figure 13B:
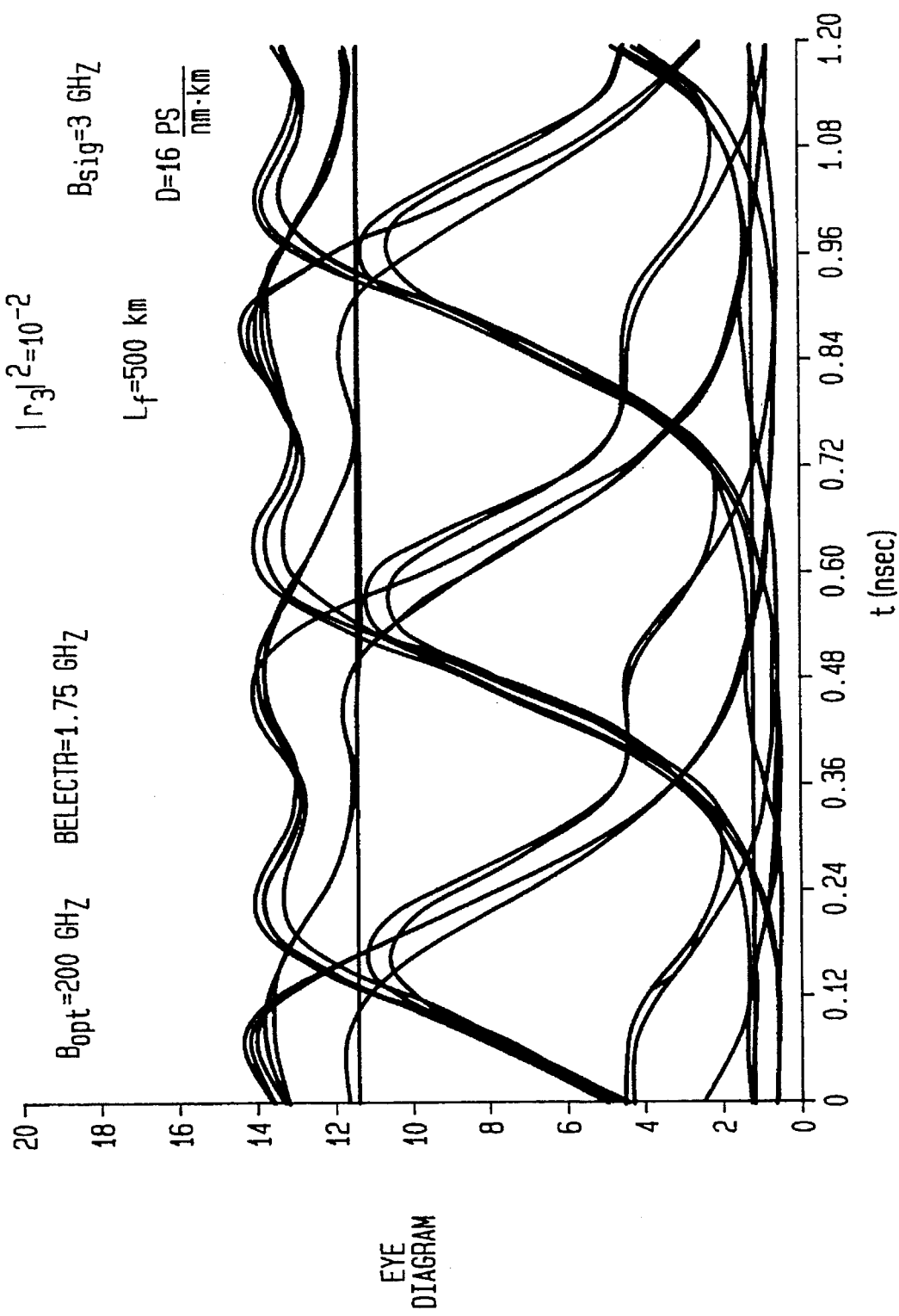
Figure 13C:
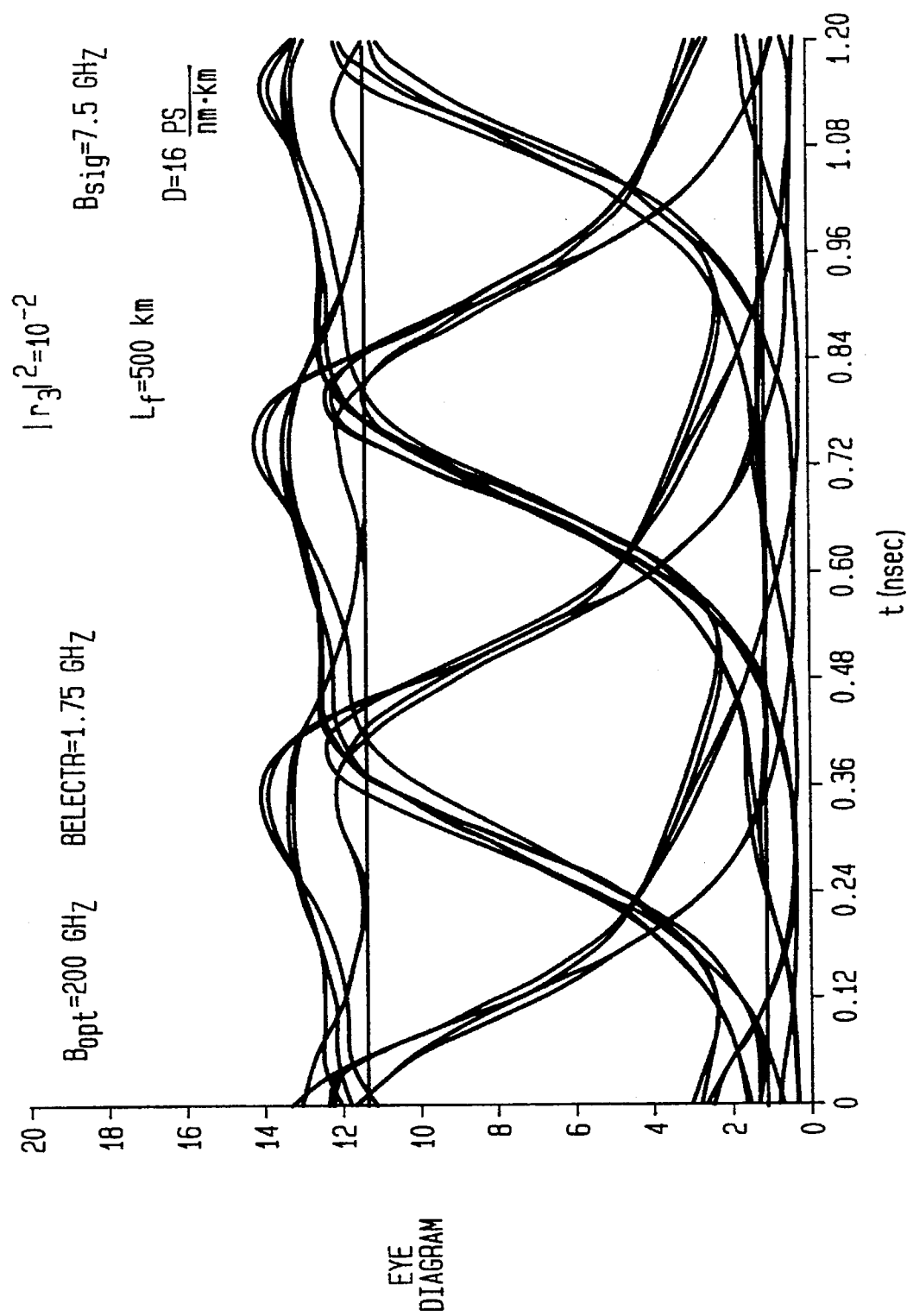

Since the eye in FIG. 12c is still wide open, it is interesting to see how much dispersion would be needed to see appreciable pulse distortion. FIGS. 13a and 13c are similar to FIGS. 12a through 12c except that the eyes shown in the figures were computed with $L_f$=500 km. At this distance, the eye in FIG. 13a ($B_{sig}$=1.75 GHz) is completely closed while the eye in FIG. 13c ($B_{sig}$=7.5 GHz) may still be acceptable. To demonstrate how much of the distortion is attributable to chirp, FIG. 14 shows an eye diagram of an unchirped pulse at $L_f$=500 km that was generated with $B_{sig}$=1.75 GHz by setting $|r_3|^2$=0 and $\alpha_{Hm}$=0. This clean-looking eye, which should be compared with FIG. 13a, demonstrates that most of the distortions seen in FIGS. 13a through 13c is attributable to chirp.

Figure 9B:
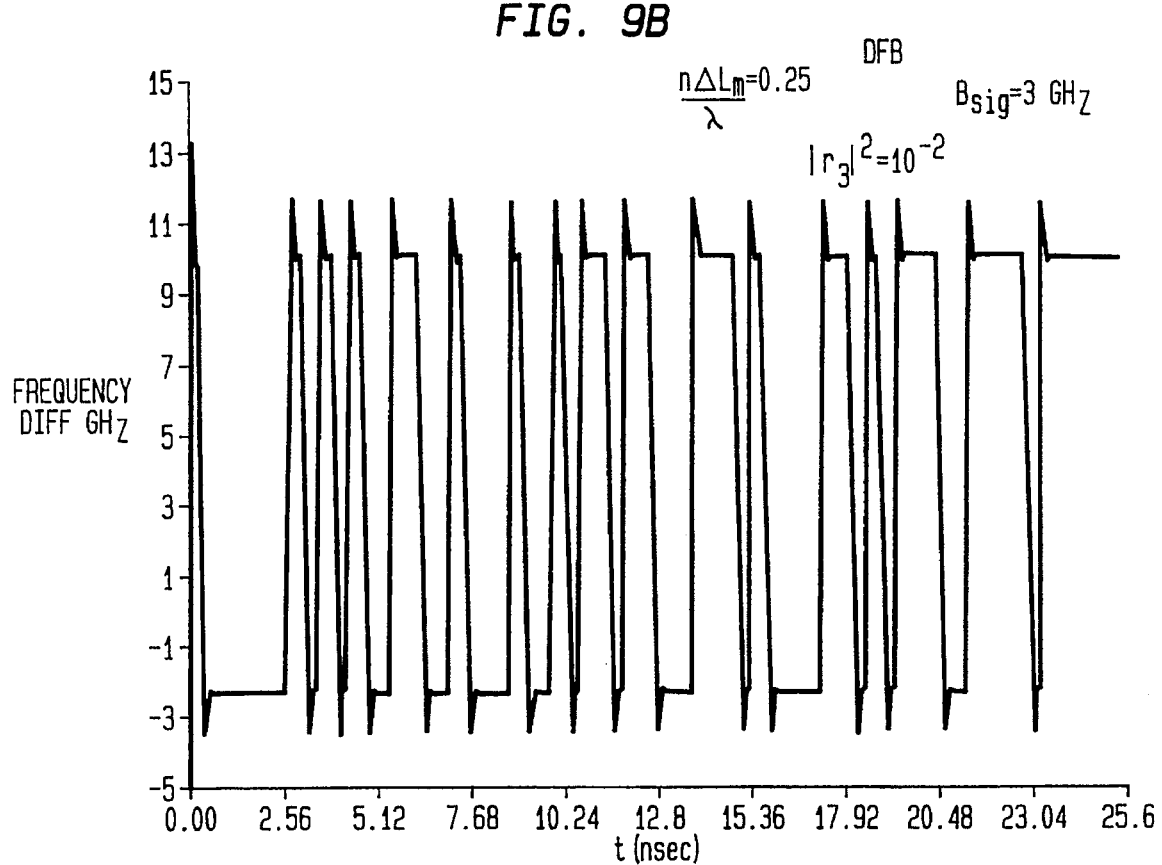
Figure 10A:
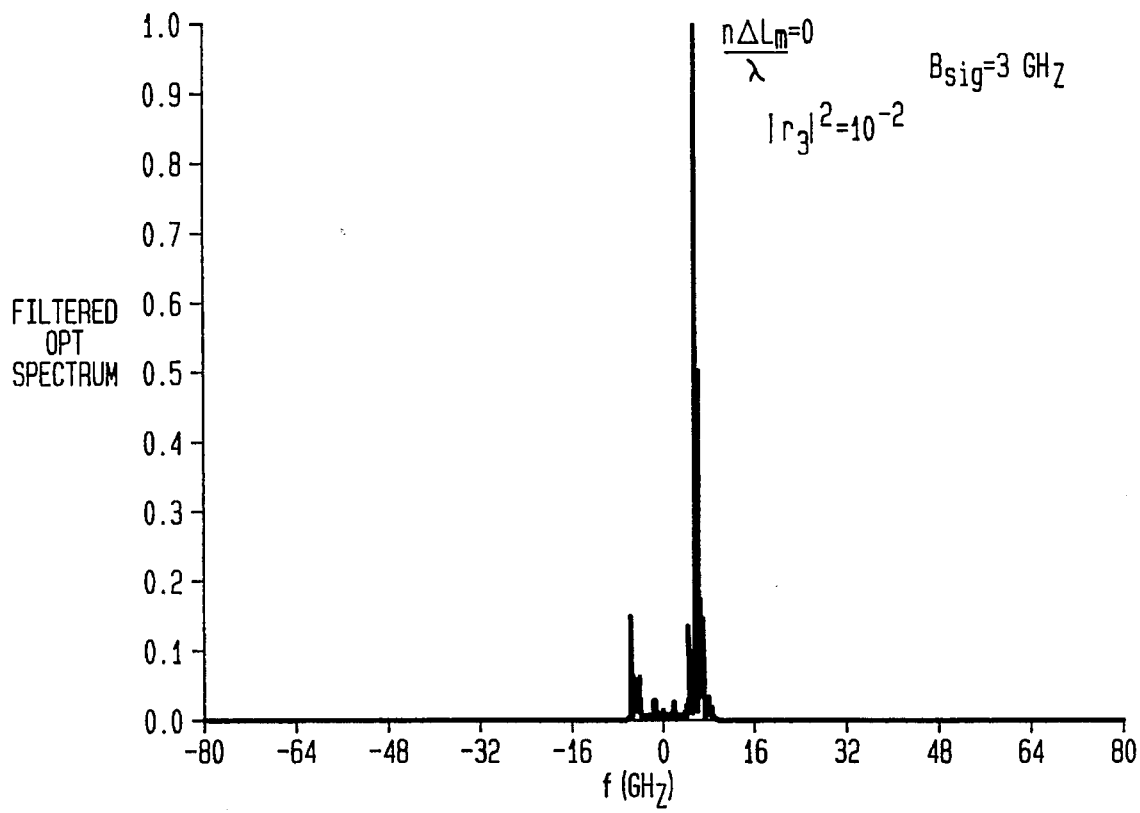
FIGS. 10a and 10b show an optical power spectrum of the modulated light showing the frequency modulation as two sharp spikes.
Figure 10B:
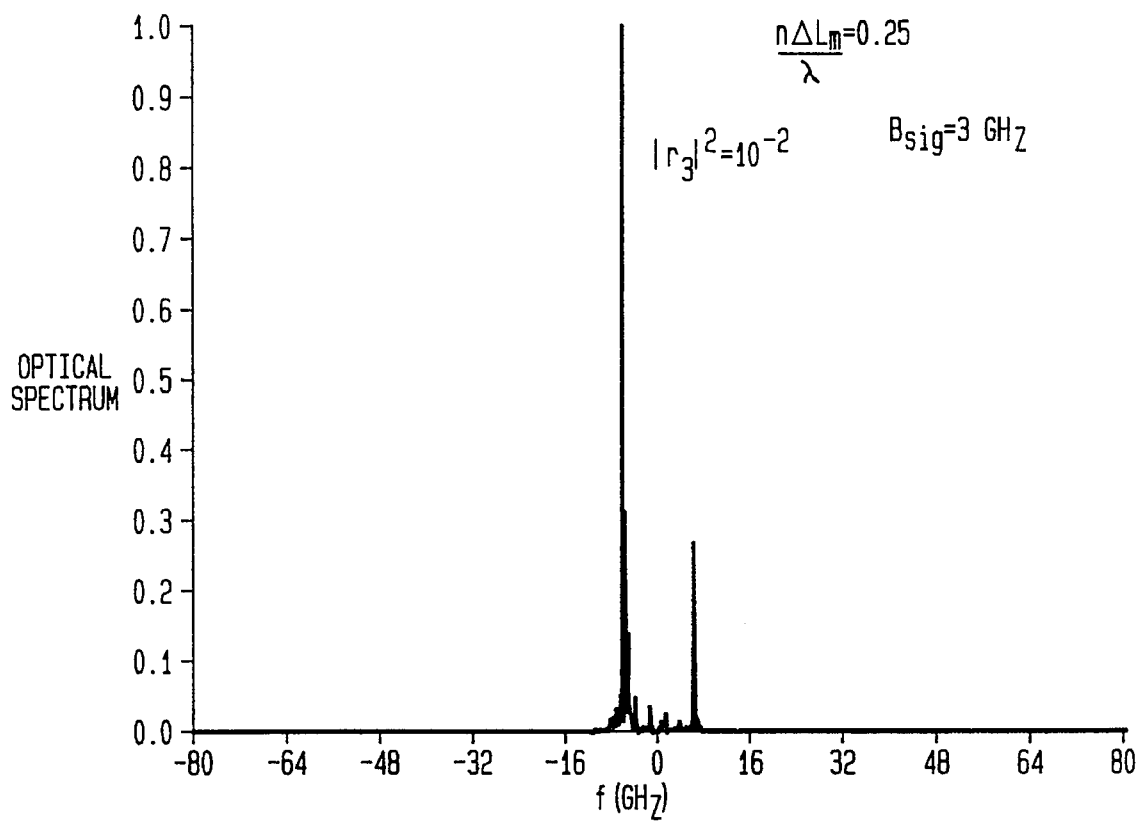

So far only eye diagrams corresponding to the chirp depicted in FIG. 9a have been discussed. Changing the length of the modulator by one quarter of a guided wavelength, the chirp changes sign, as shown in FIG. 9b. In that case, the eye diagrams shown in FIGS. 12b and 13b assume the appearance of the diagrams shown in FIGS. 15a and 15b. It is apparent that the change in the sign of the chirp is accompanied by a change in the sense of direction of the traces that tend to move into the eye opening.

A reduction of the end-facet reflectivity of the modulator from $|r_3|^2$=0.01 to $|r_3|^2$=0.001 reduces the chirp to $f_{max}-f_{min}$=4 GHz which roughly doubles the length of fiber (with D=16 ps/(nm·km)) that the pulses can traverse.

Conclusions

The simulations show that frequency modulation of the laser due to optical feedback between laser and modulator degrades the performance of the laser-modulator combination as a signal source for a dispersive fiber system. Thus, the inventors have discovered that the shape of the input pulses has a strong affect on the dispersion-induced pulse distortion. Since the modulator in the simulation has infinite bandwidth, the shape of the output pulses produced by the simulation may differ/Yom the pulse shapes produced by physical electroabsorption modulators. However, the distortion the pulse suffers in a dispersive fiber is simulated realistically in relation to its input shape. Because the frequency modulation tends to follow closely the shape of the modulating signal, it is advantageous to use pulses with sharp rising and falling edges and flat tops so that the frequency displacement of the laser remains constant during the duration of the pulse. Also desirable is a good extinction ratio between logical ones and zeros.

Appendix

Unless stated otherwise, the numerical calculations were performed with the following parameters values:

vacuum wavelength, $\lambda=1.55$ μm laser length, $L_f=366$ μm laser stripe width, w=3 μm laser junction thickness (quantum wells), d=0.05 μm density of (fictitious) lower electron level, $n_0=5\times10^5$ μm$^{-3}$ spontaneous emission lifetime, $\tau_{sp}=10^{-9}$ S DFB laser grating strength, $kL_f=1.5$ DBR laser grating strength, $kL_g=0.5$ length of DBR grating, $kL_g=175$ μm (not applicable to DFB laser)

effective refractive index of laser medium, $n_{l0}=3.25$ power scattering loss of laser waveguide, $n_{l0}/c\alpha_0=\alpha_0=0.002$ μm$^{-1}$ stimulated emission factor, $A=5\times10^{-8}c/n_{l0}\eta$[μm$^3$/s]

the filling factor, $\eta=0.05$, accounts for the quantum wells of the laser spontaneous emission capture ratio, $\gamma=10^{-5}$ linewidth enhancement factor of laser, $\alpha_{Hf}=5$ reflectivity of mirror at z=0, $|r_0|^2=0.95$ reflection coefficient between laser and modulator (DFB only), $r_1=0$, length of modulator, $L_m=224$ μm single-pass modulator power loss without r.f. voltage applied, $2(n_{m0})_ikL_m=4$ dB linewidth enhancement factor of modulator, $\alpha_{Hm}=0.5$ effective refractive index of modulator medium, $n_{m0}=3.25$ reflectivity at modulator output (unless stated otherwise), $|r_3|^2=10^{-2}$ gain saturation factor, $g_{sat}=0.1$ relative laser drive current, $J/J_{th}=3$ While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An optical communication system comprising:

laser source means for producing a light beam;

modulator means for modulating said light beam with an information signal to produce a modulated signal for transmission over an optical medium; and drive means for providing said information signal to said modulator means, said drive means shaping pulses in said information signal into substantially rectangular-shaped pulses to decrease pulse transition times of said information signal, wherein chirp in said modulated signal transmitted over said optical medium is reduced.

2. An optical communication system according to claim 1, wherein said drive means comprises a high-bandwidth driver for shaping said pulses in said information signal to have sharp rising and falling pulse edges.

3. An optical communication system according to claim 1, wherein said drive means comprises:

electrical signal generating means for generating said information signal, said information signal comprising substantially rectangular-shaped pulses; and filtering means for filtering said rectangular-shaped pulses from said electrical signal generator such that rising and falling pulse transition times are decreased.

4. An optical communication system according to claim 3, wherein said electrical signal generator means comprises a non-return to zero (NRZ) drive circuit; and said filtering means comprises a high-pass filter.

5. An optical communication system according to claim 1, wherein said laser source means and said modulator means are each disposed on a common integrated substrate.

6. An optical communication system according to claim 5, wherein said laser source means comprises one of a distributed-feedback (DFB) type of laser and a distributed Bragg reflection (DBR) type of laser; and said modulator means comprises an electro-absorptive multiple quantum well (MQW) modulator.

7. An optical communication system according to claim 1, wherein said drive means filters said information signal to decrease pulse transition times such that said pulses in said information signal provided to said modulator means have substantially sharp rise and fall times and substantially flat tops and bottoms, each substantially flat top and flat bottom pulse corresponding to respective first and second bit values in said information signal.

8. An optical communication system according to claim 1, further comprising an optical fiber transmission system optically coupled to receive said modulated signal.

9. An optical communication system according to claim 1, wherein said modulator means includes one of an electro-absorption modulator and an electro-optic modulator.

10. An optical communication system according to claim 1, wherein said modulator means comprises a modulator optically coupled to at least two complementary output ports at an exit face of said modulator, wherein light reflected at said exit face in said at least two complementary output ports recombines within said modulator such that a magnitude of light re-injected back to said laser source means is maintained substantially constant.

11. An optical communication system according to claim 10, wherein said modulator includes either a Mach-Zehnder interferometer or a directional coupler.

12. A method for reducing chirp in an optical communication system, the method comprising the steps of:

emitting a light beam;

shaping pulses in an information signal into substantially rectangular-shaped pulses to decrease transition times of said information signal to produce a shaped information signal;

modulating said light beam based on said shaped information signal to produce a modulated light signal; and transmitting said modulated light signal over an optical medium, wherein the rectangular-shaped pulses reduce chirp in said modulated light signal.

13. A method for reducing chirp according to claim 12, wherein said shaping step comprises filtering pulses in said information signal such that rising and falling pulse transition times are decreased.

14. A method for reducing chirp according to claim 12, wherein said shaping step comprises shaping said pulses in said information signal to have sharp rising and falling pulse transitions.

15. A method for reducing chirp according to claim 12, further comprising the step of coupling said modulated light signal to multiple complementary output ports prior to said transmitting step.

16. An optical communication system comprising:

laser source means for producing a light beam;

modulator means for modulating said light beam to impart pulsed information in a shaped modulated light signal having substantially rectangular-shaped pulses and reduced pulse transition times; and coupling means for outputting said shaped modulated light signal from said modulator means to an optical medium, whereby chirp in said shaped modulated light signal transmitted over said optical medium is reduced.

17. An optical communication system according to claim 16, wherein said modulator means comprises a high-bandwidth modulator coupled to driver means, said driver means providing said pulsed information to said high-bandwidth modulator.

18. An optical communication system according to claim 16, wherein said shaped modulated light signal has pulse transition times less than 25% of a bit period in said pulsed information.

19. A method for reducing chirp in an optical communication system, the method comprising the steps of:

emitting a light beam;

modulating said light beam to impart pulsed information on a shaped modulated light signal having substantially rectangular-shaped pulses and reduced pulse transition times; and transmitting said shaped modulated light signal over an optical medium.

20. A method for reducing chirp according to claim 19 wherein said shaped modulated light signal has pulse transition times less than 25% of a bit period in said pulsed information.

* * * * *